(12) United States Patent
Ozaki

(10) Patent No.: US 10,852,793 B2
(45) Date of Patent: Dec. 1, 2020

(54) COMMUNICATION SYSTEM, COMMUNICATION METHOD, AND ELECTRONIC APPARATUS

(71) Applicant: Ricoh Company, Ltd., Tokyo (JP)

(72) Inventor: Hiroki Ozaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 55 days.

(21) Appl. No.: 16/044,764

(22) Filed: Jul. 25, 2018

(65) Prior Publication Data
US 2019/0033935 A1 Jan. 31, 2019

(30) Foreign Application Priority Data

Jul. 28, 2017 (JP) .................. 2017-147259

(51) Int. Cl.
G06F 1/24 (2006.01)
H04L 12/18 (2006.01)
H04L 29/08 (2006.01)
H04L 12/24 (2006.01)
(Continued)

(52) U.S. Cl.
CPC ............ G06F 1/24 (2013.01); H04L 12/1818 (2013.01); H04L 41/0846 (2013.01); H04L 67/025 (2013.01); H04L 67/34 (2013.01); G06F 3/03542 (2013.01); G06F 3/0421 (2013.01)

(58) Field of Classification Search
CPC ...... G06F 1/24; G06F 3/0421; G06F 3/03542; H04L 12/1818; H04L 67/025; H04L 67/34; H04L 41/0846
See application file for complete search history.

(56) References Cited

U.S. PATENT DOCUMENTS 9,549,153 B1 * 1/2017 Delorenzi et al. ........ H04N 7/15
9,942,513 B1 * 4/2018 Aarrestad et al. ........ H04N 7/15
(Continued)

FOREIGN PATENT DOCUMENTS

JP 2017-068684 4/2017

OTHER PUBLICATIONS

Extended European Search Report dated Nov. 22, 2018 in Patent Application No. 18185465.4, 7 pages.

*Primary Examiner* — Nimesh G Patel
(74) *Attorney, Agent, or Firm* — Xsensus LLP

(57) ABSTRACT

A communication system includes a first electronic apparatus settable with setting information, and a second electronic apparatus settable with the setting information. The second electronic apparatus is communicably connected to the first electronic apparatus to acquire the setting information from the first electronic apparatus. The second electronic apparatus stores acquisition information indicating whether to acquire the setting information from the first electronic apparatus. The first electronic apparatus includes a memory to store the setting information, and circuitry to transmit the setting information to the second electronic apparatus in response to a determination indicating that the acquisition information indicates to acquire the setting information, and determine not to transmit the setting information to the second electronic apparatus in response to a determination indicating that the acquisition information indicates not to acquire the setting information.

9 Claims, 21 Drawing Sheets

(51) Int. Cl.
    *G06F 3/042*     (2006.01)
    *G06F 3/0354*     (2013.01)

(56) References Cited

U.S. PATENT DOCUMENTS

| | | | |
|---|---|---|---|
| 2010/0246448 A1* | 9/2010 | Krantz et al. | H04L 12/1818 370/260 |
| 2014/0376878 A1 | 12/2014 | Nakamura et al. | |
| 2014/0379751 A1 | 12/2014 | Nakamura et al. | |
| 2016/0080788 A1 | 3/2016 | Ozaki et al. | |
| 2017/0054794 A1 | 2/2017 | Yokota et al. | |
| 2017/0093930 A1 | 3/2017 | Ozaki | |
| 2017/0161048 A1 | 6/2017 | Araki | |
| 2017/0168808 A1 | 6/2017 | Kakei et al. | |
| 2018/0232138 A1* | 8/2018 | Kanematsu | G06F 3/03547 |

\* cited by examiner

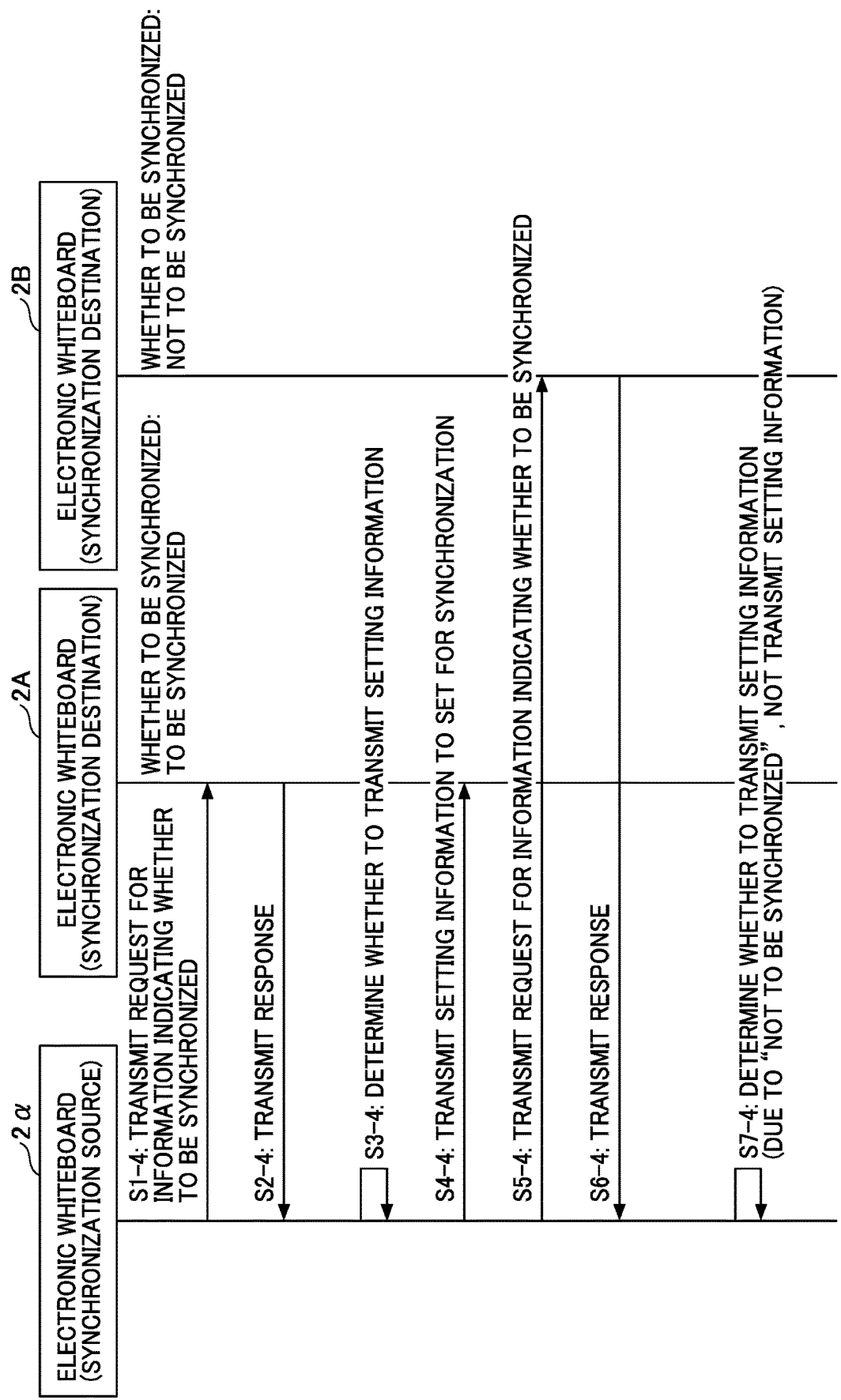

COMMUNICATION SYSTEM, COMMUNICATION METHOD, AND ELECTRONIC APPARATUS

CROSS-REFERENCE TO RELATED APPLICATION

This patent application is based on and claims priority pursuant to 35 U.S.C. 119(a) to Japanese Patent Application No. 2017-147259, filed on Jul. 28, 2017, in the Japan Patent Office, the entire disclosure of which is hereby incorporated by reference herein.

BACKGROUND

Technical Field

Embodiments of the present disclosure relate to a communication system, a communication method, and an electronic apparatus.

Related Art

Electronic whiteboards including a touch panel provided on a large type of flat panel display are known. The electronic whiteboard displays a screen having a function as a blackboard and captures a track of an electronic pen, a finger, or the like as a stroke via the touch panel to draw the strokes as manually written contents on the screen. This allows a user to use the electronic whiteboard as a blackboard.

Such an electronic whiteboard has been improved more and more. For example, the electronic whiteboard is connectable to a printer or communicable with other electronic whiteboards provided in other sites. Additionally, the number of items for the electronic whiteboard to be set by an administrator of a client has been increased. In a case where a plurality of electronic whiteboards of the same type is provided in an organization, an administrator of the plurality of electronic whiteboards is required to set the plurality of electronic whiteboards by setting information one by one.

SUMMARY

An exemplary embodiment of disclosure includes a communication system including a first electronic apparatus settable with setting information, and a second electronic apparatus settable with the setting information. The second electronic apparatus is communicably connected to the first electronic apparatus to acquire the setting information from the first electronic apparatus. The second electronic apparatus stores acquisition information indicating whether to acquire the setting information from the first electronic apparatus. The first electronic apparatus includes a memory to store the setting information, and circuitry to transmit the setting information to the second electronic apparatus in response to a determination indicating that the acquisition information indicates to acquire the setting information, and determine not to transmit the setting information to the second electronic apparatus in response to a determination indicating that the acquisition information indicates not to acquire the setting information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13 is a sequence diagram illustrating an example of a process in which the electronic whiteboard of synchronization source transmits setting information to the electronic whiteboard of synchronization destination, according to one of the embodiments (first embodiment);

Figure 1:
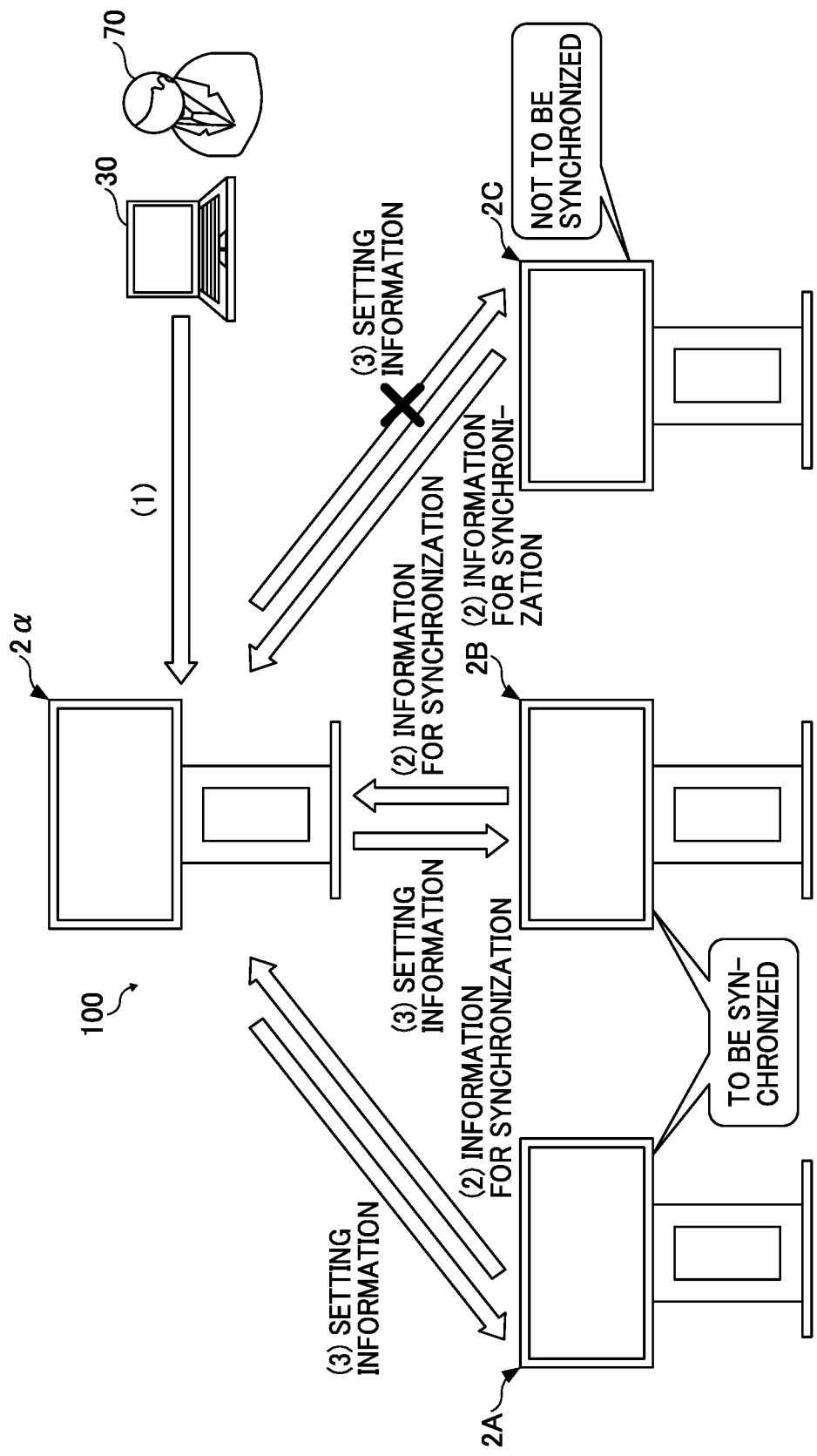
FIG. 1 is an illustration of an overview of synchronization of setting information performed by a communication system according to one of the embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of a communication system and a communication method performed by the communication system according to one of the embodiments with reference to the drawings.

First Embodiment

<Overview of Operation>

FIG. 1 is an illustration of an overview of synchronization of setting information performed by a communication system 100 according to one of the embodiments. The communication system 100 includes at least one electronic whiteboard 2α that is a synchronization source, which is referred to as the electronic whiteboard (synchronization source) 2α in the following description. The communication system 100 also includes one or more electronic whiteboards 2 that are synchronization destinations, which are referred to as (an) electronic whiteboard(s) (synchronization destination(s)) 2. When there is no need to distinguish between the synchronization source and the synchronization destination, the electronic whiteboard (synchronization source) 2α and the electronic whiteboard (synchronization destination) 2 may be individually or collectively referred to as (an) electronic whiteboard(s) 2 in the following description. Whether or not to synchronize setting information with the electronic whiteboard (synchronization source) 2α is set to the electronic whiteboard (synchronization destination) 2. Information indicating the above-described setting is referred to as "information for synchronization" or "information indicating whether to be synchronized" in the following description. Synchronization of the setting information reduces the administrator's workload. When a user wants to use the electronic whiteboard 2 that is set with settings unique to the user, such an electronic whiteboard 2 is desired not to synchronize the setting information.

The setting information includes information on various settings such as settings of a printer, settings of a template (background of electronic blackboard), settings of a mail address book, and the like. In the above-described example of the setting information, the electronic whiteboard 2 with which the user uses a specific printer or a special template is desired not to be synchronized. Additionally, there may be a case where communication using electronic mails is desired to be controlled. Additionally, there may be another case where the administrator sets settings dedicated to an important conference and the settings are desired not to be overwritten by synchronization.

A description is given of an example of operation of the electronic whiteboards 2 according to the embodiment.

(1) The administrator or the like sets setting information to the electronic whiteboard (synchronization source) 2α.

(2) The electronic whiteboard (synchronization source) 2α periodically acquires, from each of the electronic whiteboards (synchronization destinations) 2A to 2C, information for synchronization to determine whether to transmit setting information to the corresponding one of the electronic whiteboards (synchronization destinations) 2A to 2C.

(3) The electronic whiteboard (synchronization source) 2α transmits the setting information to the electronic whiteboard (synchronization destination) 2 having the information for synchronization that indicates "to be synchronized".

In the example of FIG. 1, the electronic whiteboard (synchronization source) 2α transmits the setting information to the electronic whiteboards (synchronization destinations) 2A and 2B, because the information for synchronization of the electronic whiteboards (synchronization destinations) 2A and 2B indicates "to be synchronized". The setting information is not transmitted to the electronic whiteboard (synchronization destination) 2C because the information for synchronization of the electronic whiteboard (synchronization destination) 2C indicates "not to be synchronized".

Thus, in the communication system 100 according to the present embodiment, the administrator is not required to set information (e.g., IP address) on the electronic whiteboard (synchronization source) 2α to the electronic whiteboard (synchronization destination) 2, resulting in reduction of the administrator's workload. Moreover, the administrator can set information for synchronization for each synchronization destination, so that the electronic whiteboard (synchronization destination) 2, which is not desired to be synchronized, is set not to synchronize the setting information with the electronic whiteboard (synchronization source) 2α. Additionally, even when the administrator wrongly sets the electronic whiteboard (synchronization destination) 2 to the electronic whiteboard (synchronization source) 2α, the information for synchronization of the electronic whiteboard (synchronization destination) 2, in which "not to be synchronized" is set, prevents a situation in which the electronic whiteboard (synchronization destination) 2, which is not desired to be synchronized, is wrongly synchronized.

In the following description, any one of the plurality of electronic whiteboards including the electronic whiteboard (synchronization source) 2α and the electronic whiteboards (synchronization destinations) 2A and 2B may be individually or collectively referred to as the "electronic whiteboard (s) 2", when there is no need to distinguish for the synchronization source and the synchronization destination. One of the electronic whiteboards 2 that serves as a synchronization source is referred to as the electronic whiteboard (synchronization source) 2α. Additionally, in a case in which the electronic whiteboards 2 that are the synchronization destinations are required to be distinguish each other, an alphabet character is added to distinguish among the electronic whiteboards (synchronization destinations) 2, such as the electronic whiteboard (synchronization destination) 2A and the electronic whiteboard (synchronization destination) 2B.

<Terms>

A term, "setting information", is defined as settings related to the operation of the electronic whiteboard 2. For example, the settings include settings for operating appropriately, settings for connecting the Internet and/or communicating with other devices via a network, settings set according to user's preference, settings for allowing or prohibiting an operation, and settings for activating/deactivating each function.

A term, "administrator", is used in the description of the embodiments for convenience to represent a person who sets the setting information to the electronic whiteboard 2. A general user or a person in charge of the electronic whiteboard 2 also may be a person who sets the electronic whiteboard 2.

"Acquisition information" is defined as information indicating whether the electronic whiteboard (synchronization destination) 2 acquires the setting information or not. When the electronic whiteboard (synchronization destination) 2 acquires the setting information, the acquired setting information is to be synchronized. Accordingly, the information is related to whether the setting information is to be synchronized. In the description, the "acquisition information" is replaceable with the "information for synchronization" or "information indicating whether to be synchronized".

<Configuration of Communication System 100>

Figure 2:
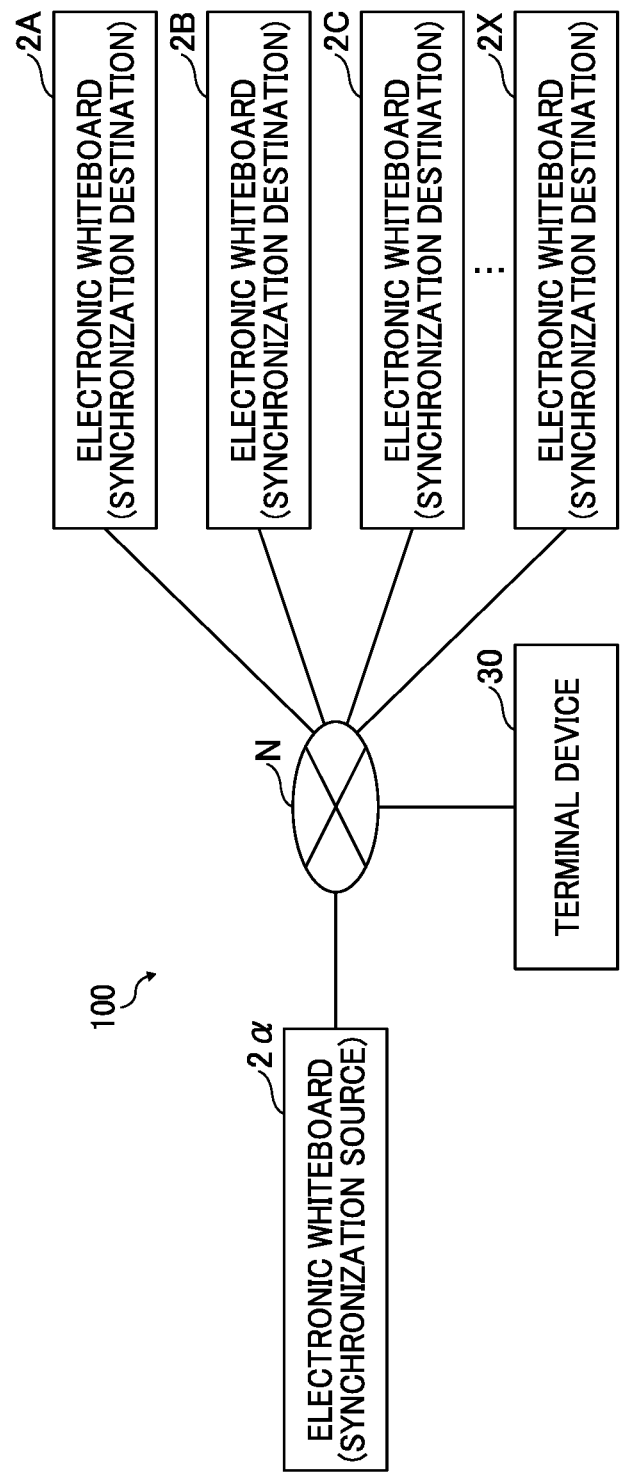
FIG. 2 is an illustration of a schematic configuration of the communication system according to one of the embodiments.

FIG. 2 is an illustration of a schematic configuration of the communication system 100 according to the present embodiment. The communication system 100 includes the electronic whiteboard (synchronization source) 2α, one or more electronic whiteboard (synchronization destination) 2, and the terminal device 30. The terminal device 30 serves as a device that communicates with the electronic whiteboard 2 to set or check the setting information, so that the terminal device 30 may not be included in the communication system 100.

The communication system 100 may be referred to as an apparatus system for a reason that electronic apparatuses such as the electronic whiteboards 2 communicate with each other. Alternatively, the communication system 100 may be referred to as an image processing system or an information processing system because processing images, for example. A name of the system (communication system 100) may be appropriately changeable according to a type of the electronic apparatus included in the communication system 100. For example, when the electronic apparatus is an electronic whiteboard, the system may be referred to as an electronic whiteboard system, and when the electronic apparatus is a Multi-Function Peripherals (MFP), the system may be referred to as a MFP system.

A network N is, for example, a local area network (LAN) used in an office or the like. The network N may include the Ethernet (Registered Trademark). The network N may include the Internet. For example, one of the electronic whiteboards 2 may be connected to a virtual private network (VPN) to communicate with another one of the electronic whiteboards 2 that is provided in one of branch offices or oversea. The network N is configured as one or both of a wired network and a wireless network. Besides the network N, a dedicated wire such as a USB cable may be used for the connection. Additionally, the communication may be established using Bluetooth (Registered Trademark).

The electronic whiteboard 2 includes a large display with a touch panel to detect coordinates of a point pointed by the user on a board surface, and to display a stroke by connecting the coordinates of the points. Additionally, the electronic whiteboard 2 can be connected to a personal computer (PC) to display an image and/or video image being displayed with the PC. The electronic whiteboard 2 also can synchronize a stroke with another electronic whiteboard 2 provided in a different site. The electronic whiteboard 2 may be referred to as an electronic information board, for example.

The electronic whiteboard 2 has a function as an information processing apparatus as clearly illustrated in a block diagram illustrating a hardware configuration, which is described later. Although the electronic whiteboard 2 is used to describe the embodiments, the disclosure is applicable to any other type of electronic apparatuses being capable of performing synchronization of setting information. For example, the disclosure is applicable to an image forming apparatus such as a copier, a printer, a scanner, a multifunction peripheral, a MFP, a network camera including an all-weather-type camera and an omnidirectional camera, a production printing machine such as a commercial printing machine, a projector, and a videoconference terminal. The disclosure is further applicable to a game machine, a head mounted display, a car navigation system, a digital camera, and a drone, for example.

A model of the electronic whiteboard (synchronization source) 2α may be different from that of the electronic whiteboard (synchronization destination) 2 as long as a manufacturer of the electronic whiteboard (synchronization source) 2α and the electronic whiteboard (synchronization destination) 2 is the same, for example. For example, a target to be the electronic whiteboard (synchronization destination) 2 includes an electronic whiteboard having the same product name that the electronic whiteboard (synchronization source) 2α has. Additionally, the target to be the electronic whiteboard (synchronization destination) 2 includes, for example, an electronic whiteboard having the same product name that the electronic whiteboard (synchronization source) 2α has but a release time that is different from that of the electronic whiteboard (synchronization source) 2α. The target to be the electronic whiteboard (synchronization destination) 2 includes, for example, an electronic whiteboard having a product name that is different from that of the electronic whiteboard (synchronization source) 2α. Because the plurality of electronic whiteboards that can synchronize the setting information each other has the same operating system (OS), application or firmware (a version of program is not be required to be the same) even when hardware has a different, the plurality of electronic whiteboards has the same setting items. Additionally, the setting items may not be completely the same, as long as there are one or more items in common.

The electronic whiteboards 2 that are targets to be synchronization destinations are managed by the administrator and registered by the electronic whiteboard (synchronization source) 2α, using, for example, an IP address of the electronic whiteboards (synchronization destinations) 2. Even when the electronic whiteboard (synchronization source) 2α registers the electronic whiteboard 2 that does not have a function for synchronization, this does not cause a big problem because the electronic whiteboard 2 registered as a synchronization destination can ignore the registration. Even when the electronic whiteboard 2, which has the function for synchronization, but is not a target to be a synchronized destination, is wrongly registered in the electronic whiteboard (synchronization source) 2α, there is no problem as long as the information for synchronization is set as "not to be synchronized" in the electronic whiteboard (synchronization destination) 2.

The electronic whiteboard (synchronization source) 2α is one of the electronic whiteboards 2 and set as a synchronization source. The electronic whiteboard (synchronization source) 2α is not required to have a special function. Accordingly, the electronic whiteboard (synchronization destination) 2 can switch to the electronic whiteboard (synchronization source) 2α depending on a setting made by the administrator. Additionally, one of the electronic whiteboards 2 to be the electronic whiteboard (synchronization source) 2α may have a special function.

Additionally, the electronic whiteboard (synchronization source) 2α may not have a function as an electronic whiteboard. That is, the electronic whiteboard (synchronization source) 2α may be an information processing apparatus such as a PC that stores the setting information. The PC may be provided in a LAN, or installed as a server on the Internet or a cloud.

The terminal device 30 is an information processing apparatus, which communicates with any of the electronic whiteboards 2, is used by the administrator to set various settings or check a setting condition. The administrator operates the terminal device 30 to set the setting information in the electronic whiteboard (synchronization source) 2α. Additionally, the administrator operates the terminal device 30 to set the setting information in any of the electronic whiteboards (synchronization destinations) 2. The terminal device 30 also can display the setting information that is currently reflected on the electronic whiteboard 2.

Browser software (or a program having a function equivalent to the browser software) is operating in the terminal device 30. The electronic whiteboard 2 also has a function of a web server. Accordingly, a general-purpose information processing apparatus may be the terminal device 30. More specifically, the terminal device 30 may include a PC, a smartphone, a tablet terminal, a wearable PC, such as a sunglasses type PC or a wristwatch type PC, and a personal digital assistant (PDA). The terminal device 30 also includes a game machine and a navigation device in which the browser software or a program equivalent to the browser software operates.

<Overview of Operation of Electronic Whiteboard>

Figure 3:
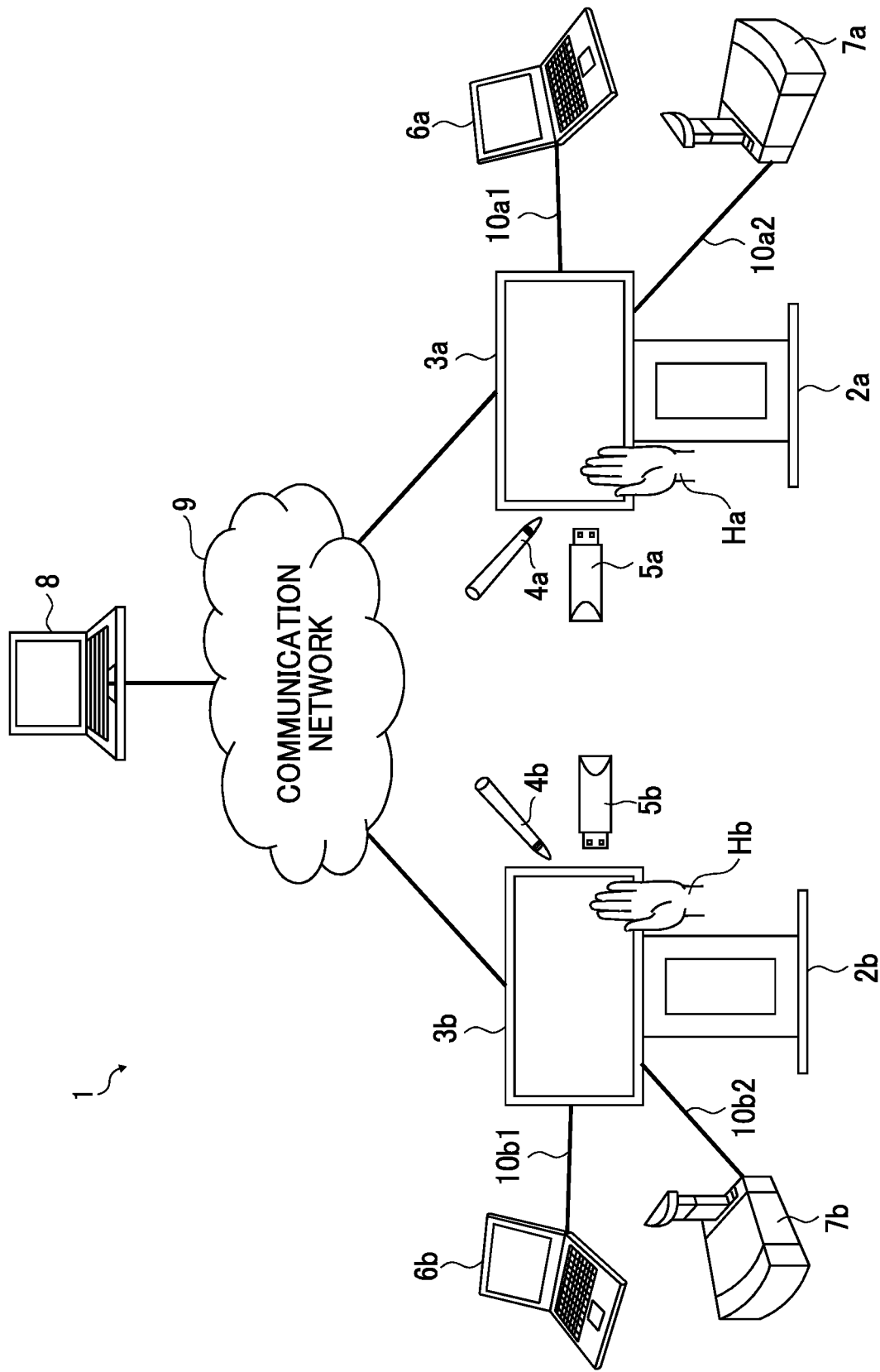
FIG. 3 is an illustration of an overview of operation of electronic whiteboards according to one of the embodiments.

FIG. 3 is an illustration of an overview of operation of electronic whiteboards 2 according to the present embodiment. In FIG. 3, only two electronic whiteboards 2a and 2b and two electronic pens 4a and 4b, etc., are illustrated for purposes of simplification. However, three or more electronic whiteboards and electronic pens, etc., may be used. In a general use, it is not necessary for a user to pay attention to whether the electronic whiteboard 2 is a synchronization source or a synchronization destination.

As illustrated in FIG. 3, an electronic whiteboard system 1 includes a plurality of electronic whiteboards 2a and 2b, a plurality of electronic pens 4a and 4b, Universal Serial Bus (USB) memories 5a and 5b, notebook personal computers (PCs) 6a and 6b, videoconference terminal 7a and 7b, and a PC 8. The electronic whiteboards 2a and 2b and the PC 8 are communicably connected to each other via a communication network 9. Further, the electronic whiteboard 2a and the electronic whiteboard 2b are provided with display 3a and the display 3b, respectively.

Additionally, the electronic whiteboard 2a can display an image drawn by an event generated by the electronic pen 4a (e.g., the pen tip or the bottom of the electronic pen 4a touches the display 3a) on the display 3a. Further, the electronic whiteboard 2a may change the drawing image being displayed on the display 3a, according to an event made by a user's hand Ha. For example, in response to a user's gesture indicating size enlargement, size reduction, or turning pages, the electronic whiteboard 2a changes a displayed image.

The USB memory 5a is connectable to the electronic whiteboard 2a, and the electronic whiteboard 2a may read or write electronic files such as data in a portable document format (PDF) from or onto the USB memory 5a. The electronic whiteboards 2a is connected to the note PC 6a via a cable 10a1 to be communicable in compliance with a standard such as DisplayPort (Registered Trademark), Digital Visual Interface (DVI), High-Definition Multimedia Interface (HDMI; Registered Trademark), or Video Graphics Array (VGA). On the electronic whiteboard 2a, an event is caused by touching on the display 3a, and the event information indicating the event is transmitted to the note PC 6a in a similar manner to events input through an input device such as a mouse and a keyboard. Additionally, the videoconference terminal 7a is connected to the electronic whiteboard 2a via the cable 10a2 to be communicable using the above-described standard. The function of the videoconference terminal 7a may be incorporated in the electronic whiteboard 2. Alternatively, the note PC 6a and the videoconference terminal 7a may communicate with the electronic whiteboard 2a through a wireless connection based on various types of radio communication protocols such as Bluetooth (Registered Trademark).

At another site where the electronic whiteboard 2b is provided, in a similar manner to the above, the electronic whiteboard 2b including a display 3b, an electronic pen 4b, a USB memory 5b, a note PC 6b, a videoconference terminal 7b, a cable 10b1, and a cable 10b2 is used. According to the event caused by a user's hand Hb, for example, an image displayed on the display 3b is changeable.

Accordingly, an image that is drawn on the display 3a of the electronic whiteboard 2a at one site is also displayed on the display 3b of the electronic whiteboard 2b at the other site. By contrast, the image drawn on the display 3b of the electronic whiteboard 2b at the other site is also displayed on the display 3a of the electronic whiteboard 2a at the one site. As described above, a common image is shared and processed with remotely located sites, so that the electronic whiteboard system 1 facilitates a videoconference.

Hereinafter, any one display among multiple displays is referred to as the display 3.

<Example of Hardware Configuration>
<Hardware Configuration of Electronic Whiteboard>

Figure 4:
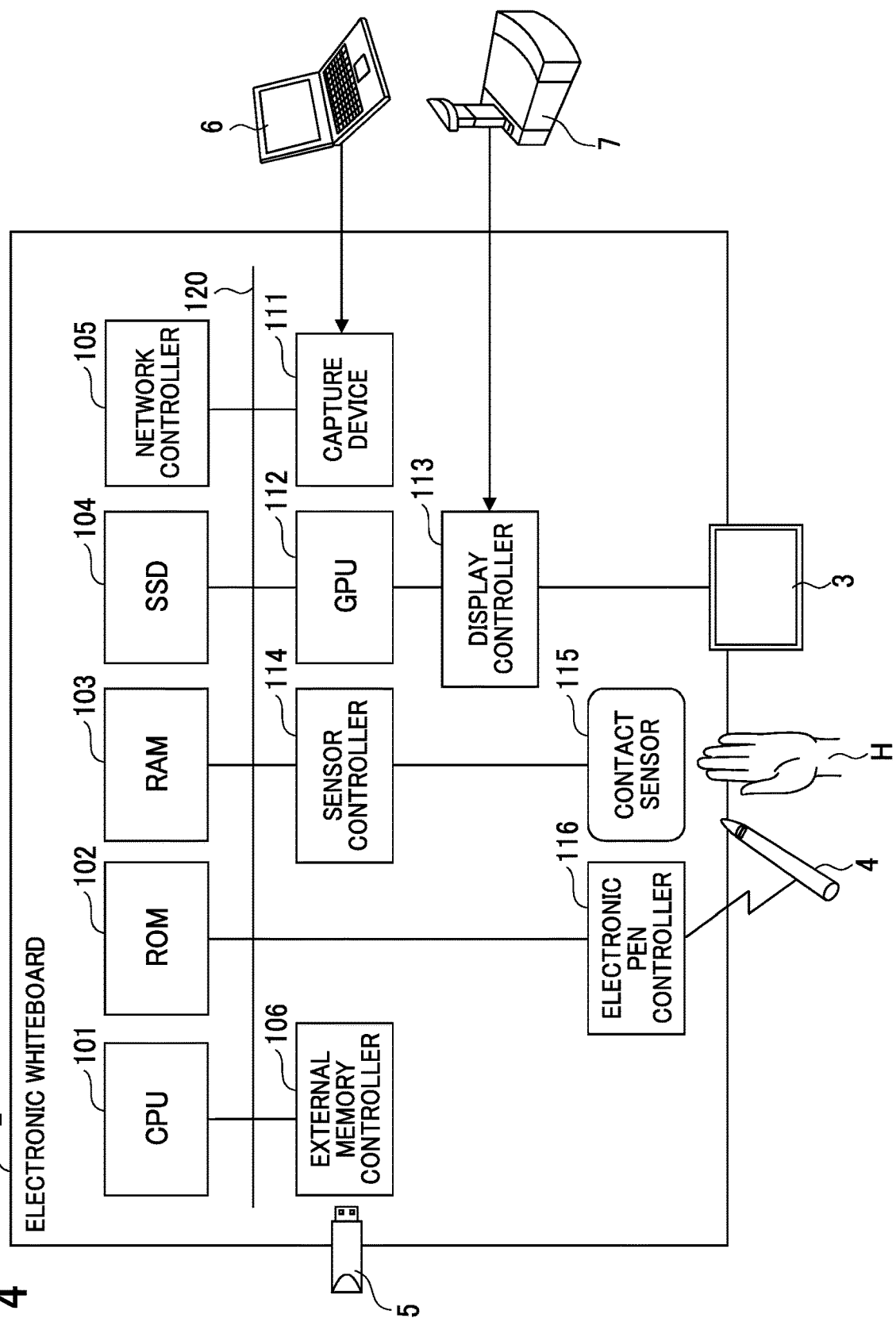
FIG. 4 is a block diagram illustrating a hardware configuration of the electronic whiteboard according to one of the embodiments.

Hereinafter, a description is given of a hardware configuration of the electronic whiteboard 2 with reference to FIG. 4. FIG. 4 is a block diagram illustrating a hardware configuration of the electronic whiteboard 2.

As illustrated in FIG. 4, the electronic whiteboard 2 includes a central processing unit (CPU) 101 that controls the entire operation of the electronic whiteboard 2, a read only memory (ROM) 102 that stores a program for operating the CPU 101 such as an initial program loader (IPL), a random access memory (RAM) 103 that operates as a work area for the CPU 101, a solid state drive (SSD) 104 that controls reading or writing of various types of data including control program stored in a memory, a network controller 105 that controls communication via the communication network 9, and an external memory controller 106 that controls communication with the USB memory 5.

The electronic whiteboard 2 further includes a capture device 111 that transmits image data (still or video image) for displaying on a display of the note PC 6, a graphics processing unit (GPU) 112 that processes graphics, and a display controller 113 that controls and manages a screen display to output image data from the GPU 112 to the display 3 or the videoconference terminal 7, for example.

The electronic whiteboard 2 further includes a sensor controller 114 and a contact sensor 115. The sensor controller 114 controls the contact sensor 115. The contact sensor 115 detects a touch onto the display 3 with the electronic pen 4 or the user's hand H. The contact sensor 115 inputs and detects coordinates using an infrared interception method. More specifically, the display 3 is provided with two light receiving elements disposed on both upper side ends of the display 3, and a reflector frame disposed at the sides of the display 3. The light receiving elements emit a plurality of infrared rays in parallel to a surface of the display 3. The light receiving elements receive lights passing in the direction that is the same as an optical path of the emitted infrared rays, which are reflected by the reflector frame. The contact sensor 115 outputs an identifier, or identification information (ID) of the infrared ray that is blocked by an object (such as the user's hand) after being emitted from the light receiving elements, to the sensor controller 114. Based on the ID of the infrared ray, the sensor controller 114 detects a specific coordinate that is touched. Each of the IDs described below is one of examples of identification information.

The contact sensor 115 is not limited to the one with the infrared blocking method, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display.

In addition, the electronic whiteboard 2 includes an electronic pen controller 116. The electronic pen controller 116 communicates with the electronic pen 4 to detect a touch touched by the tip or bottom of the electronic pen 4 to the display 3. In addition or in alternative to detecting a touch by the tip or bottom of the electronic pen 4, the electronic pen controller 116 may also detect a touch by another part of the electronic pen 4, such as a part held by a hand of the user.

The electronic whiteboard 2 further includes a bus line 120 such as an address bus and a data bus to electrically connects the CPU 101, the ROM 102, the RAM 103, the SSD 104, the network controller 105, the external memory controller 106, the capture device 111, the GPU 112, the sensor controller 114, and the electronic pen controller 116 to each other, as illustrated in FIG. 3.

The program for the electronic whiteboard 2 may be stored on a computer-readable recording medium such as a compact disk read only memory (CD-ROM) for distribution.

<Hardware Configuration of Terminal Device>

Figure 5:
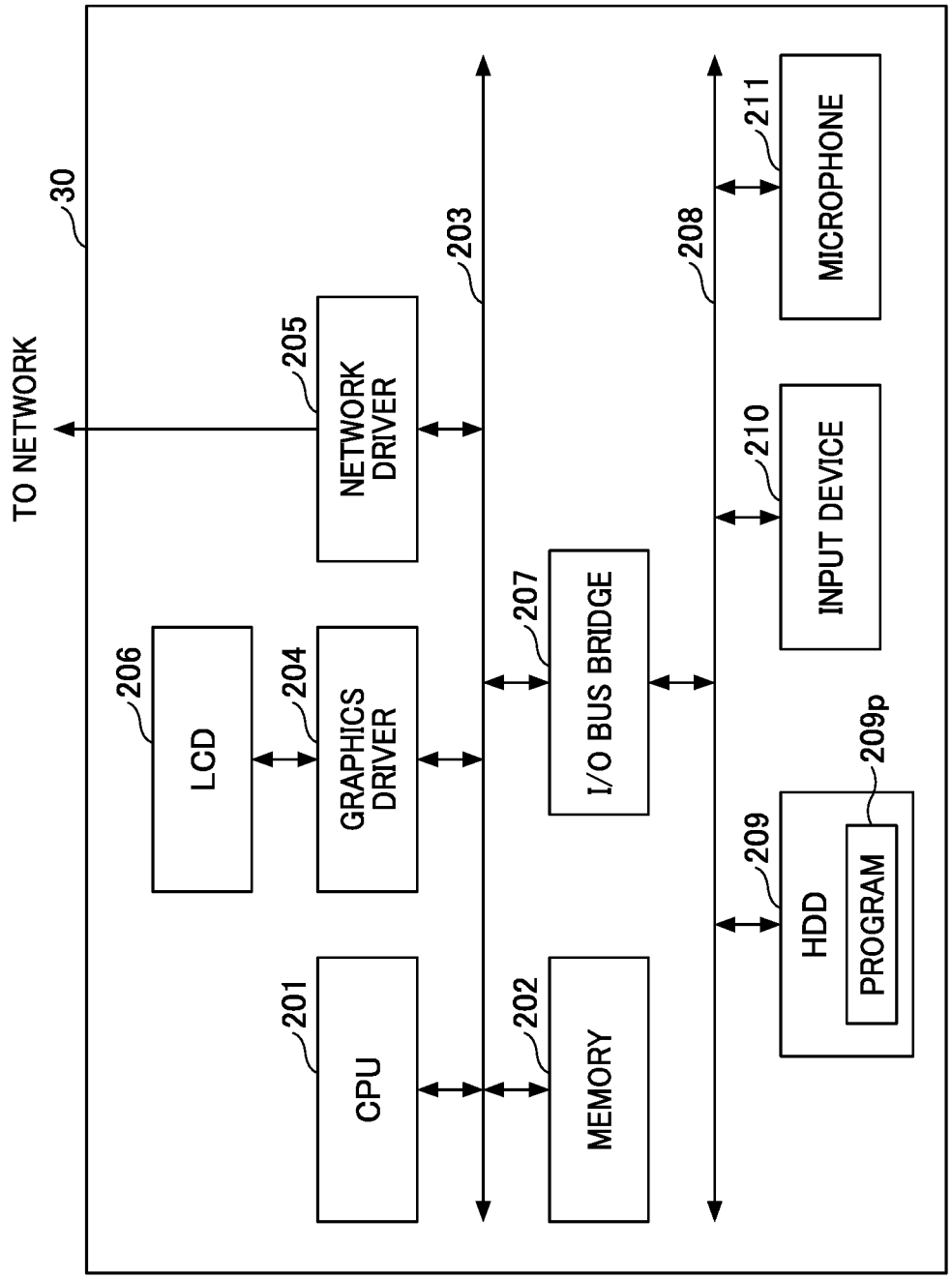
FIG. 5 is a block diagram illustrating a hardware configuration of a terminal device according to one of the embodiments.

FIG. 5 is a block diagram illustrating a hardware configuration of the terminal device 30. The terminal device 30 includes, for example, a CPU 201 and a memory 202 that enables the CPU 201 to access the data at high speed. The CPU 201 and the memory 202 are connected to other devices or drivers of the terminal device 30, such as a graphics driver 204 and a network driver (NIC) 205, through a system bus 203.

The graphics driver 204 is connected to a liquid crystal display (LCD) 206 through a bus and monitors a processing result of the CPU 201. Additionally, the network driver 205 connects the terminal device 30 to the network N at a transport layer level and a physical layer level to establish a session with the electronic whiteboard 2, for example.

Further, an input-output (I/O) bus bridge 207 is connected to the system bus 203. On the downstream side of the I/O bus bridge 207, a storage device such as a hard disc drive (HDD) 209 is connected through an I/O bus 208 such as a peripheral component interconnect (PCI), in compliance with integrated device electronics (IDE), an advanced technology attachment (ATA), an AT attachment packet interface (ATAPI), serial ATA, a small computer system interface (SCSI), a USB, etc. The HDD 209 stores a program 209p (for example, browser software) for controlling the entire terminal device 30. The HDD 209 is replaceable with a solid state drive (SSD). The program 209p may be distributed, as being stored in a recording medium. Alternatively, the program 209p may be distributed from a server for program distribution.

Further, an input device 210 such as a keyboard and a mouse (also referred to as a pointing device) is connected to the I/O bus 208 through a bus such as a USB. The input device 210 accepts inputs or instructions from an operator such as a system administrator.

The hardware configuration of the terminal device 30 illustrated in FIG. 5 including the hardware elements is merely one of the examples.

<Functions>

Figure 6:
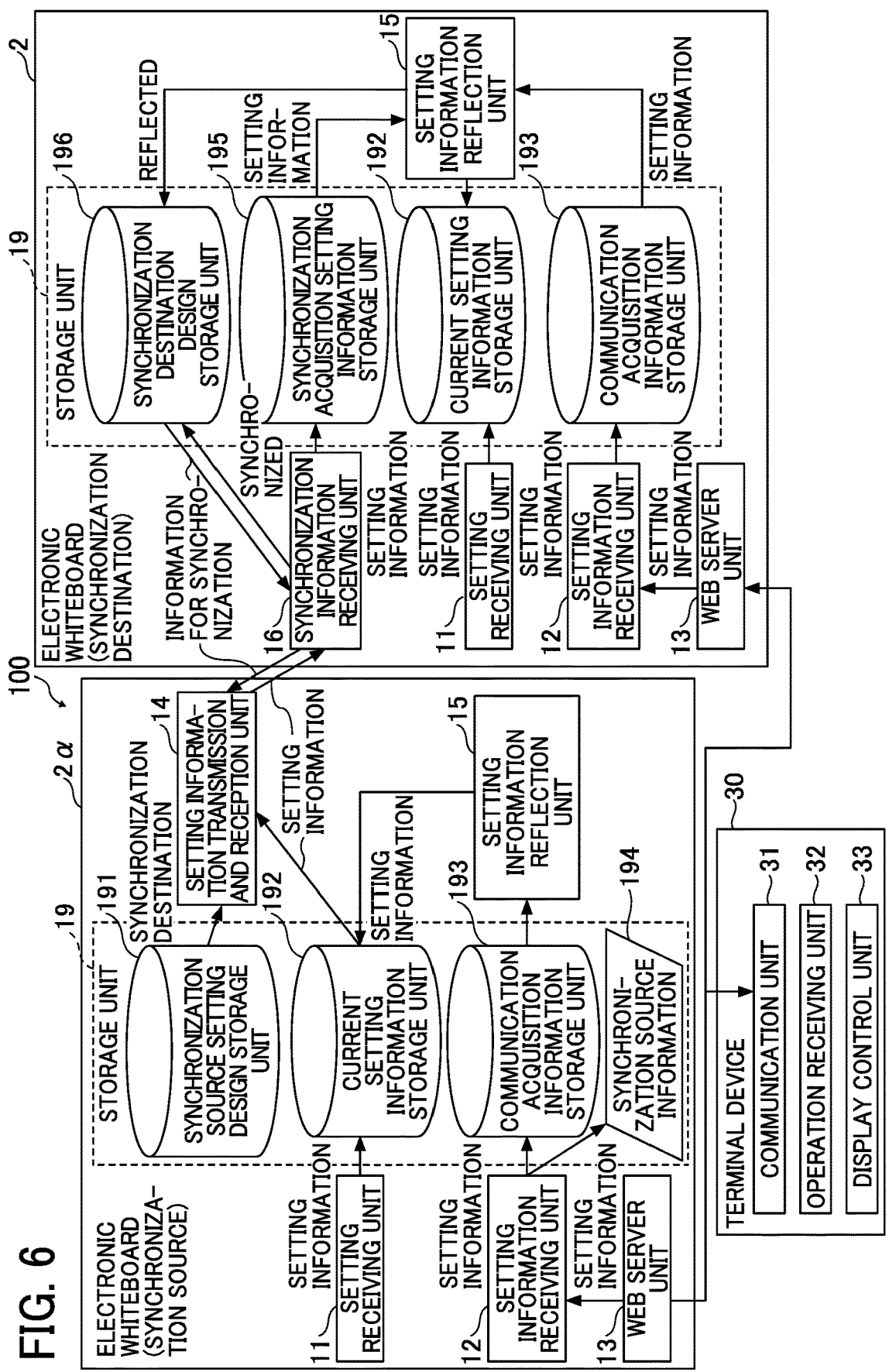
FIG. 6 is a block diagram illustrating a functional configuration of one of the electronic whiteboards that is a synchronization source, another one of the electronic whiteboards that is a synchronization destination, and the terminal device according to one of the embodiments.

A description is given of an example of functions of the electronic whiteboard (synchronization source) 2α, the electronic whiteboard (synchronization destination) 2, and a terminal device 30 which are included in the communication system 100 with reference to FIG. 6. FIG. 6 is a block diagram illustrating a functional configuration of the electronic whiteboard 2α, which is the synchronization source, the electronic whiteboard 2, which is the synchronization destination, and the terminal device 30.

<<Electronic Whiteboard (Synchronization Source) 2α>>

The electronic whiteboard (synchronization source) 2α includes a setting receiving unit 11, a setting information receiving unit 12, a web server unit 13, a setting information transmission and reception unit 14, and a setting information reflection unit 15. Each of the above-mentioned units included in the electronic whiteboard (synchronization source) 2α is a function or a means that is implemented by operating any of the elements illustrated in FIG. 4 according to an instruction from the CPU 101 according to an electronic whiteboard control program, which is expanded from the SSD 104 to the RAM 103.

The electronic whiteboard (synchronization source) 2α includes a storage unit 19. The storage unit 19 is a storage means implemented by the SSD 104, the RAM 103 or the ROM 102, which are illustrated in FIG. 4, for storing various types of information. The storage unit 19 includes a synchronization source setting design storage unit 191, a current setting information storage unit 192, a communication acquisition information storage unit 193, and synchronization source information 194.

Hereinafter, a description is given of information stored in the storage unit 19. The synchronization source information 194 is information indicating that one of the electronic whiteboards 2 storing the synchronization source information 194 is the electronic whiteboard (synchronization source) 2α. The communication acquisition information storage unit 193 stores setting information that is set via the terminal device 30. The current setting information storage unit 192 stores setting information that is currently reflected on the electronic whiteboard (synchronization source) 2α. The reflected setting information is setting information used for controlling (or defining) the electronic whiteboard (synchronization source) 2α. Accordingly, information stored in both the current setting information storage unit 192 and the communication acquisition information storage unit 193 is defined as the setting information in the present embodiment.

TABLE 1

| Printer Address | 192.168.10.01 |
|---|---|
| Mail Address Book | mail207_05_12.txt |
| Contact List | Clist2017_06_12.txt |
| Shared Folder | file:// . . . /hoge8 |
| Template | Template1 |

Table 1 schematically illustrates an example of the setting information stored in the current setting information storage unit 192 or the communication acquisition information storage unit 193. The setting information has many items, and items illustrated in Table 1 are some of the items. Table 1 includes an item of printer address indicating a printer address, an item of mail address book indicating a mail address book, an item of contact list indicating a contact list, an item of shared folder indicating a shared folder, and an item of template indicating a template. The printer address is an internet protocol (IP) address used by an electronic whiteboard. The mail address book is a list of addresses of electronic mails (e-mails) that can be transmitted from the electronic whiteboard. The contact list is a list of other electronic whiteboards (for example, IP addresses) with which the electronic whiteboard communicates. The shared folder is a folder in which the electronic whiteboards 2 in the communication system 100 commonly stores page data (stroke data corresponding to one screen) and the like. The template is image data (texture) of a background displayed on the display.

As described above, the setting information includes a lot of information that is also set on the electronic whiteboard 2. Accordingly, synchronization of the setting information can reduce the workload, which is setting the setting information for each electronic whiteboard 2, of the administrator.

TABLE 2

| Synchronization Destination List | 192.168.10.02 |
|---|---|
| | 192.168.10.03 |
| | 192.168.10.04 |
| | . . . |
| Synchronization Timing | *At 6:00 |
| | At Restarting |
| | Every 12 hours |

Table 2 schematically illustrates the information stored in the synchronization source setting design storage unit 191. The synchronization source setting design storage unit 191 has, for example, an item of synchronization destination list indicating a synchronization destination list and an item of synchronization timing indicating synchronization timings. The synchronization destination list is information used for communicating with the electronic whiteboards (synchronization destinations) 2. For example, an IP address is registered in the synchronization destination list. The synchronization timing is a timing at which the setting information is transmitted to the electronic whiteboard (synchronization destination) 2. For example, a predetermined time in a day, a restart time, and/or a periodical time (every predetermined time) is set as a timing. At the synchronization timing, the electronic whiteboard (synchronization source) 2α starts transmitting the setting information to each electronic whiteboard registered in the synchronization destination list. As described in the present embodiment, the setting information is not always transmitted. The information stored in the synchronization source setting design storage unit 191 is set in advance by the administrator, for example.

(Function of Electronic Whiteboard (Synchronization Source) 2α) The setting information is set in the electronic whiteboard (synchronization source) 2α by one of two methods. One is a method referred to as UI setting in which the administrator inputs the setting information by operating the display 3 having a touch panel (UI: User Interface). The other is a method referred to as web setting, in which the administrator sets the setting information using the terminal device 30. Web setting further includes a way of setting in which the administrator sets information for each item and a method in which the administrator sets information and another way of setting in which text data describing the setting information for all items (e.g., extensible markup language (XML)) is collectively set.

The setting receiving unit 11 receives setting of the setting information for the electronic whiteboard (synchronization source) 2α input via the display 3. The setting receiving unit 11 stores the received setting information in the current setting information storage unit 192. That is, when the setting receiving unit 11 receives the setting information, the setting information is reflected on the electronic whiteboard (synchronization source) 2α in real time. The setting receiving unit 11 is implemented by the CPU 101 of the electronic whiteboard (synchronization source) 2α executing a program to control the electronic pen controller 116 and the contact sensor 115.

The web server unit 13 generates a web page described in Hypertext Markup Language (HTML), JavaScript (Registered Trademark), Cascading Style Sheets (CSS), and the like, and transmits the web page to the terminal device 30. The web server unit 13 may be referred to as a web application, because generating a web page dynamically. In the embodiment, a web page used for setting the setting information is transmitted to the terminal device 30, and the setting information is acquired from the terminal device 30. The web server unit 13 is implemented by the CPU 101 of the electronic whiteboard (synchronization source) 2α executing a program and controlling the network controller 105.

The setting information receiving unit 12 acquires the setting information acquired from the terminal device 30 via the web server unit 13 and stores the setting information in the communication acquisition information storage unit 193. The setting information is reflected on the electronic whiteboard (synchronization source) 2α when the electronic whiteboard (synchronization source) 2α shuts down and starts up. The setting information receiving unit 12 is implemented by the CPU 101 of the electronic whiteboard (synchronization source) 2α executing a program.

When the electronic whiteboard (synchronization source) 2α shuts down and starts up, the setting information reflection unit 15 causes the current setting information storage unit 192 to store the setting information stored in the communication acquisition information storage unit 193. The electronic whiteboard 2 operates based on the setting information stored in the current setting information storage unit 192. That is, storing the setting information, which is stored in the communication acquisition information storage unit 193, in the current setting information storage unit 192 means that the setting information is reflected on the electronic whiteboard 2. Accordingly, when the electronic whiteboard (synchronization source) 2α shuts down and starts up after the terminal device 30 transmits the setting information, the setting information is reflected to the operation of the electronic whiteboard (synchronization source) 2α. The setting information reflection unit 15 is implemented by the CPU 101 of the electronic whiteboard (synchronization source) 2α executing a program.

The setting information transmission and reception unit 14 starts transmitting a request for the information for synchronization to the electronic whiteboard (synchronization destination) 2 at the synchronization timing set in the synchronization source setting design storage unit 191, and starts transmitting the setting information when the information for synchronization indicates "to be synchronized". The setting information transmission and reception unit 14 is not required to record a result of an inquiry or presence or absence of transmission. The setting information transmission and reception unit 14 transmits the setting information when the following conditions are satisfied.

1. Information for synchronization indicates "to be synchronized".
2. The synchronization state indicates "Unsynchronized" (or does not indicate "Synchronized" or "Reflected").

The condition 1 is used to prevent the electronic whiteboard (synchronization destination) 2 that is not desired to be synchronized from receiving the setting information. The condition 2 is used to prevent the electronic whiteboard (synchronization destination) 2 from receiving the same setting information. The setting information transmission and reception unit 14 is implemented by the CPU 101 of the electronic whiteboard (synchronization source) 2α executing a program and controlling the network controller 105.

<<Electronic Whiteboard (Synchronization Destination) 2>>

In the following description of a function of the electronic whiteboard (synchronization destination) 2, differences from the electronic whiteboard (synchronization source) 2α are mainly described. The electronic whiteboard (synchronization destination) 2 includes the setting receiving unit 11, the setting information receiving unit 12, the web server unit 13, the setting information reflection unit 15, and a synchronization information receiving unit 16. Accordingly, the electronic whiteboard (synchronization destination) 2 is different from the electronic whiteboard (synchronization source) 2α in including the synchronization information receiving unit 16.

Further, the storage unit 19 of the electronic whiteboard (synchronization destination) 2 includes a synchronization destination setting design storage unit 196, a synchronization acquisition setting information storage unit 195, the current setting information storage unit 192, and the communication acquisition information storage unit 193. Accordingly, the electronic whiteboard (synchronization destination) 2 is different from the electronic whiteboard (synchronization source) 2α in including the synchronization acquisition setting information storage unit 195 and the synchronization destination setting design storage unit 196.

Hereinafter, a description is given of the synchronization acquisition setting information storage unit 195. The electronic whiteboard (synchronization destination) 2 acquires the setting information by one of three methods. Two of the three methods are the UI setting and the web setting, which are the same as that of the electronic whiteboard (synchronization source) 2α. A third method is a method referred to as synchronization setting in which the electronic whiteboard (synchronization destination) 2 receives the setting information from the electronic whiteboard (synchronization source) 2α. Accordingly, the synchronization acquisition setting information storage unit 195 stores the setting information transmitted from the electronic whiteboard (synchronization source) 2α.

TABLE 3

| | |
|---|---|
| Information for Synchronization (whether to be synchronized) | "to be synchronized" or "not to be synchronized" |
| Synchronization State | "Unsynchronized" or "Synchronized" or "Reflected" |
| Restarting Timing | *At 6:00<br>At Restarting<br>Every 12 hours |

Table 3 schematically illustrates information stored in the synchronization destination setting design storage unit 196. Information for synchronization, a synchronization state, and a restart timing are set in the synchronization destination setting design storage unit 196. The information for synchronization is information indicating whether the electronic whiteboard (synchronization destination) 2 is synchronize the setting information with the electronic whiteboard (synchronization source) 2α. Either "to be synchronized" or "not to be synchronized" is set as the information for synchronization. When "to be synchronized" is set, the electronic whiteboard (synchronization destination) 2 synchronizes the setting information. More specifically, the electronic whiteboard (synchronization destination) 2 receives the setting information from the electronic whiteboard (synchronization source) 2α. When "not to be synchronized" is set, the electronic whiteboard (synchronization destination) 2 does not synchronize the setting information. More specifically, the electronic whiteboard (synchronization destination) 2 does not receive the setting information from the electronic whiteboard (synchronization source) 2α.

The synchronization state indicates a state associated with the setting information transmitted from the electronic whiteboard (synchronization source) 2α. The synchronization state indicates one of the three states: "Unsynchronized", "Synchronized", or "Reflected". "Unsynchronized" is a state in which the setting information is not received. "Synchronized" is a state in which the setting information is received (state required to be reflected). "Reflected" is a state in which the setting information has been already reflected (reflection is not required). When being in the "Unsynchronized" state, the electronic whiteboard (synchronization destination) 2 is able to receive the setting information.

The restart timing is a timing at which the electronic whiteboard (synchronization destination) 2 is shuts down and starts up. Restart is defined as startup that performed immediately after shutdown. The electronic whiteboard 2 reflects the setting information by shutting down and starting up, namely, reflects the setting information at the restarting timing.

The information stored in the synchronization destination setting design storage unit 196 is set in advance by the administrator using the terminal device 30 or via the display 3.

(Function of Electronic Whiteboard (Synchronization Destination) 2) The synchronization information receiving unit 16 refers to the synchronization destination setting design storage unit 196 to transmit the information for synchronization to the electronic whiteboard (synchronization source) 2α. When transmitting "to be synchronized" as the information for synchronization, the synchronization information receiving unit 16 receives the setting information from the electronic whiteboard (synchronization source) 2α. That is, when the above-described conditions 1 and 2 are satisfied, the synchronization information receiving unit 16 receives the setting information. The synchronization information receiving unit 16 is implemented by the CPU 101 of the electronic whiteboard 2 executing a program and controlling the network controller 105.

<<Terminal Device 30>>

The terminal device 30 includes a communication unit 31, an operation receiving unit 32, and a display control unit 33. Each of the above-mentioned functional units of the terminal device 30 is a function or a means that is implemented by operating any of the elements illustrated in FIG. 5 according to an instruction from the CPU 201 according to a program, which is expanded from the HDD 209 to the memory 202.

The communication unit 31 transmits and receives various information to and from the electronic whiteboard (synchronization source) 2α or the electronic whiteboard (synchronization destination) 2. In the embodiment, the communication unit 31 receives the web page and transmits the setting information. The communication unit 31 is implemented by the CPU 201 of the terminal device 30 executing the program 209p and controlling the network driver 205.

The operation receiving unit 32 receives various operations performed by the administrator using the terminal device 30. The operation receiving unit 32 is implemented by the CPU 201 of the terminal device 30 executing the program 209p to control the input device 210, for example.

The display control unit 33 analyzes the web page transmitted from the electronic whiteboard 2 and generates a screen to be displayed by the LCD 206. Further, the display control unit 33 updates the screen according to a user input received by the operation receiving unit 32. The display control unit 33 is implemented by the CPU 201 of the terminal device 30 executing the program 209p to control the graphics driver 204, for example.

<Example of Setting Synchronization Source>

In the embodiment, any one of the electronic whiteboards 2 becomes the electronic whiteboard 2α that is the synchronization source by setting as a synchronization source. The other electronic whiteboards 2 that are not set as a synchronization source are registered in the synchronization destination list as the synchronization destinations.

Figure 7:
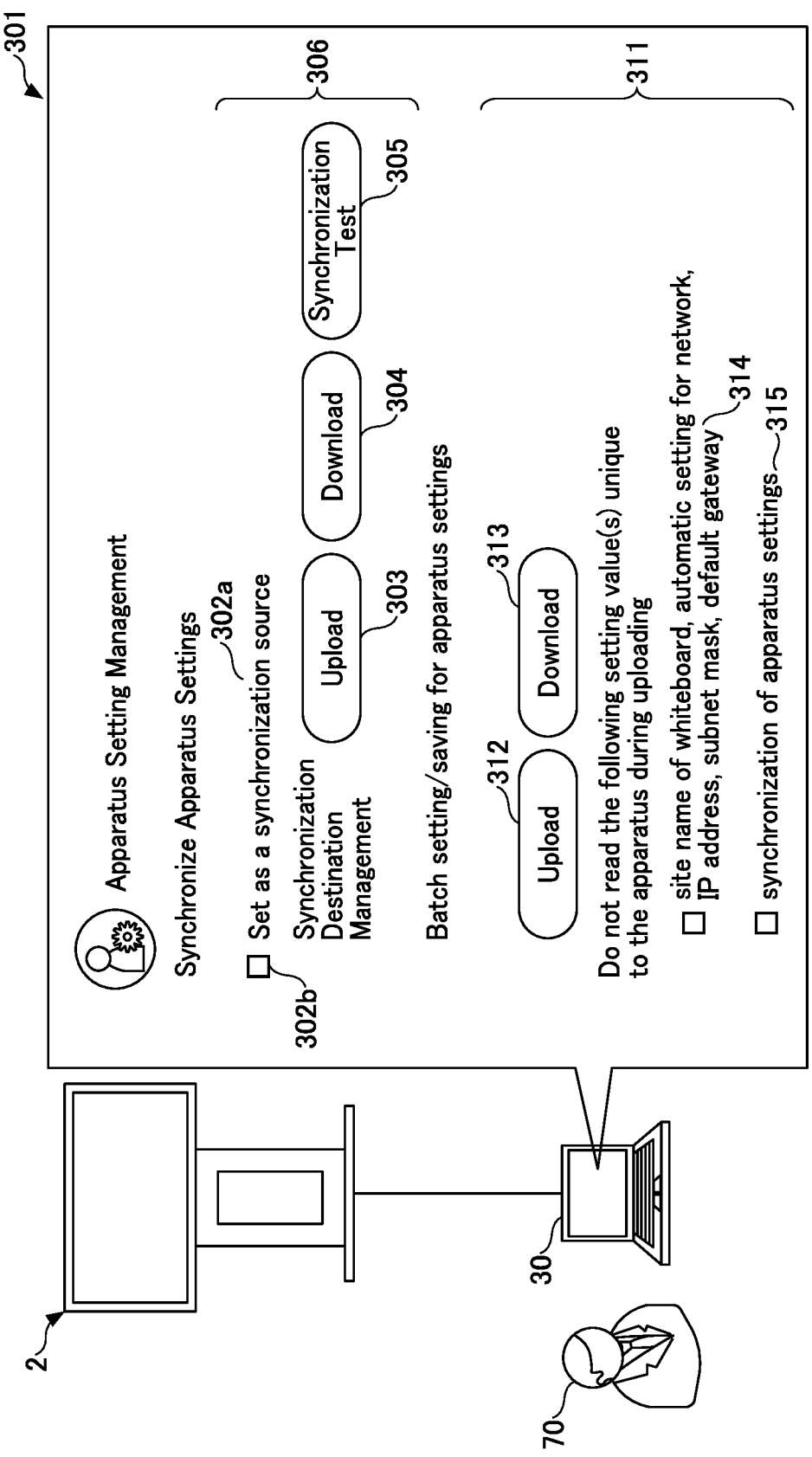
FIG. 7 is an illustration of a synchronization source setting screen displayed on a liquid crystal display (LCD) by browser software of the terminal device according to one of the embodiments.

FIG. 7 is an illustration of a synchronization source setting screen 301 displayed on the LCD 206 by the browser software of the terminal device 30. The administrator designates one of the electronic whiteboards 2 to be set as a synchronization source via the terminal device 30 and causes the terminal device 30 to display the synchronization source setting screen 301 by acquiring the web page.

The synchronization source setting screen 301 has a synchronization source setting area 306. The synchronization source setting area 306 has a message 302a, "Set as a synchronization source" and a check box 302b. When the administrator clicks (presses) the check box 302b, the operation receiving unit 32 receives the operation, and the display control unit 33 displays a check mark in the check box 302b. When the above setting is transmitted to the one of the electronic whiteboards 2, which is a communication destination of the terminal device 30, the one of the electronic whiteboards 2, namely, the electronic whiteboard (synchronization source) 2α, is set as the synchronization source.

The synchronization source setting area 306 also has an upload button 303, a download button 304, and a synchronization test button 305. The upload button 303 is a button for transmitting the synchronization destination list as illustrated in Table 2 from the terminal device 30 to the electronic whiteboard 2. The download button 304 is a button for receiving the synchronization destination list as illustrated in Table 2 from the electronic whiteboard 2 to the terminal device 30. The synchronization test button 305 is a button for testing whether the electronic whiteboard (synchronization destination) 2 registered in the synchronization destination list can be synchronized with the electronic whiteboard (synchronization source) 2α. When the synchronization test button 305 is clicked, the electronic whiteboard (synchronization source) 2α receives the setting information from the electronic whiteboard (synchronization destination) 2. With the above-described operation, not only a communication test at an IP layer, but also a communication test at an application layer is performed.

Further, there is a batch setting area 311 for the setting information in a bottom side of the synchronization source setting screen 301. The batch setting area 311 for the setting information has an upload button 312 and a download button 313. The download button 313 is a button with which the terminal device 30 receives the setting information from the any one of the electronic whiteboards 2 electronic whiteboard 2, and the upload button 312 is a button for uploading the setting information to the electronic whiteboard 2. As described above, the terminal device 30 downloads and uploads all the setting information collectively.

It is noted that there is description indicating that "site name of whiteboard, automatic setting for network, IP address, subnet mask, default gateway" 314 is not to be uploaded. This is because the presence of two or more electronic whiteboard having the same settings each other may cause interference with communication and the like. In addition, there is a description indicating that information whether settings are for the synchronization source ("synchronization of apparatus settings" 315) is not to be uploaded. This is because if the settings for the synchronization source are synchronized, all the electronic whiteboards are set as the electronic whiteboard (synchronization source) 2α.

In addition to the synchronization source setting screen 301 as illustrated in FIG. 7, a setting screen for setting the information for synchronization is also displayed on the terminal device 30 so that the administrator can set the information for synchronization. Alternatively, the information for synchronization may be set by the UI setting.

Figure 8:
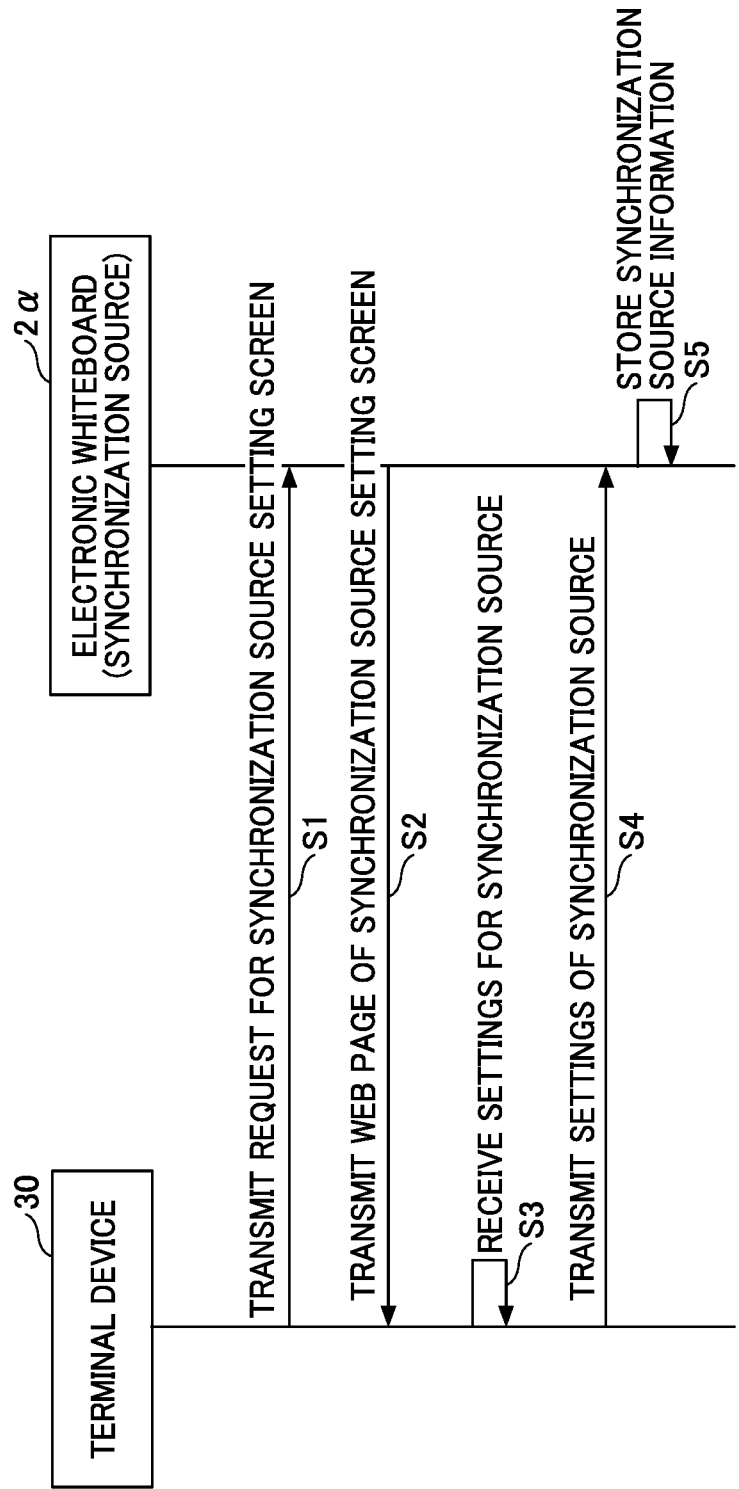
FIG. 8 is a sequence diagram illustrating an example of a process in which the terminal device sets one of the electronic whiteboards as a synchronization source according to one of the embodiments.

FIG. 8 is a sequence diagram of an example of a process in which the terminal device 30 sets the electronic whiteboard (synchronization source) 2α.

S1: When the administrator operates the terminal device 30, the communication unit 31 transmits an acquisition request for the synchronization source setting screen 301 to the electronic whiteboard (synchronization source) 2α. The electronic whiteboard (synchronization source) 2α is selected among the electronic whiteboards 2 by the administrator as a synchronization source, and the IP address and the like thereof are known in advance.

S2: The web server unit 13 of the electronic whiteboard (synchronization source) 2α transmits the web page of the synchronization source setting screen 301 in response to the acquisition request for the synchronization source setting screen 301.

S3: The display control unit 33 of the terminal device 30 displays the synchronization source setting screen 301. When the administrator clicks (presses) the check box 302b for the message 302a, which is "Set as the synchronization source", the operation receiving unit 32 receives the operation.

S4: The communication unit 31 of the terminal device 30 transmits to the electronic whiteboard (synchronization source) 2α information indicating that the electronic whiteboard (synchronization source) 2α is set as a synchronization source. Alternatively, the information may be transmitted by any other operation for transmitting, which is an operation indicating transmitting clearer than simply clicking (pressing) the check box 302b.

S5: The web server unit 13 of the electronic whiteboard (synchronization source) 2α receives the information indicating that the electronic whiteboard (synchronization source) 2α is set as a synchronization source, and the setting information receiving unit 12 causes the storage unit 19 to store the information as the synchronization source information 194.

<Setting Setting Information>

Hereinafter, a description is given of setting the setting information on the electronic whiteboard 2 with reference to FIGS. 9 to 11. One of the electronic whiteboards 2 to be set, here, may be either the synchronization source or the synchronization destination.

Figure 9:
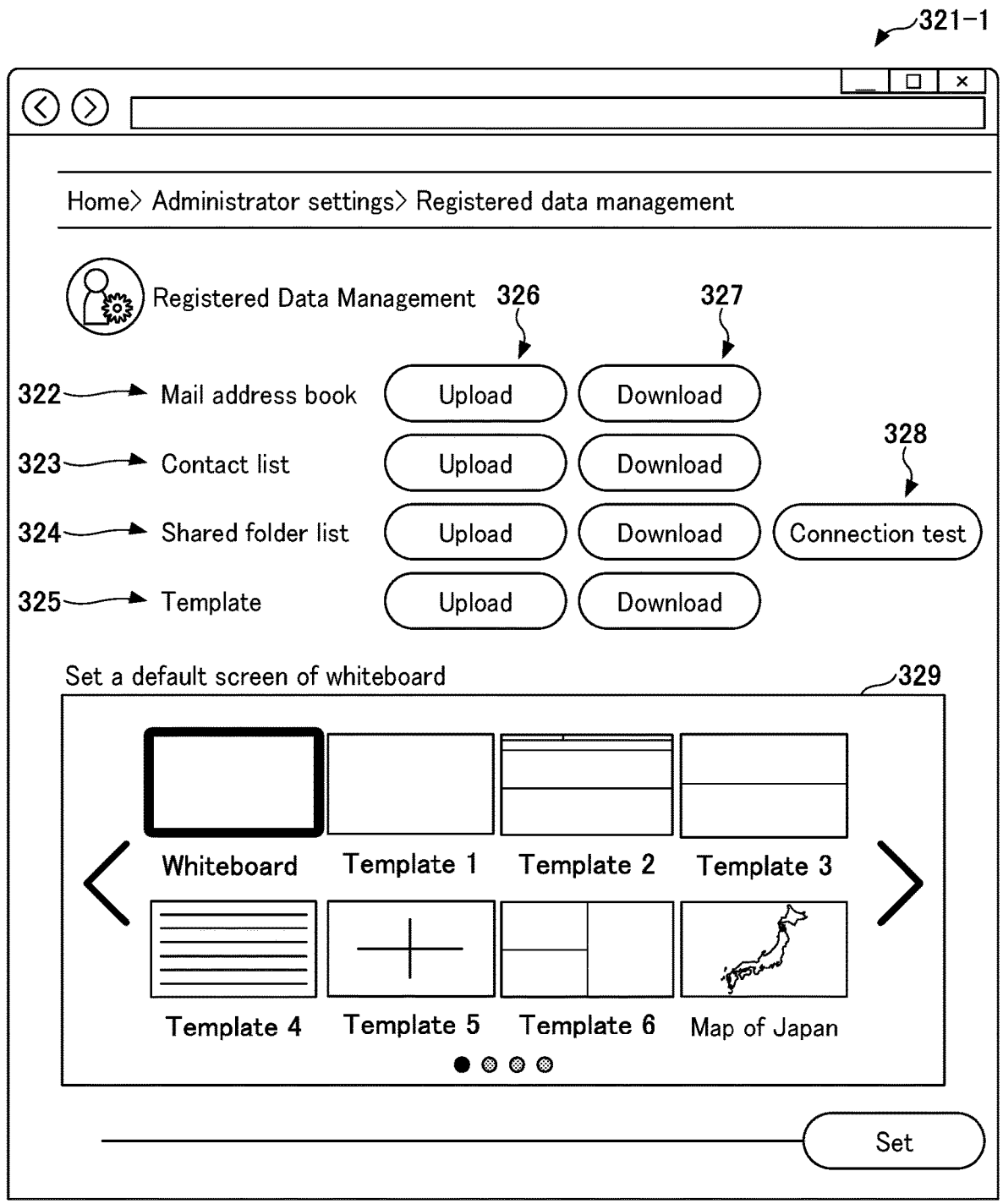
FIG. 9 is an illustration of a setting information setting screen displayed on the LCD by the browser software of the terminal device according to one of the embodiments.

FIG. 9 is an illustration of a setting information setting screen 321-1 (web setting) displayed on the LCD 206 by the browser software of the terminal device 30. The administrator designates one of the electronic whiteboards 2 for setting the setting information via the terminal device 30, and causes the terminal device 30 to display the setting information setting screen 321-1 by acquiring the web page.

The setting information setting screen 321-1 has a mail address book setting field 322, a contact list setting field 323, a shared folder list setting field 324, and a template setting field 325. The mail address book setting field 322 has an upload button 326, and the administrator can set a mail address book by uploading a prepared mail address book. Additionally, a download button 327 is a button for acquiring the mail address book currently set on the electronic whiteboard 2, with the terminal device 30. The same applies to the contact list setting field 323 and the template setting field 325. With respect to the template setting field 325, an image 329 including example templates is displayed, and the administrator selects one of the templates to displayed by the electronic whiteboard 2.

The shared folder list setting field 324 further includes a connection test button 328. The connection test button 328 is a button for testing whether the electronic whiteboard 2 can access a shared folder.

Figure 10:
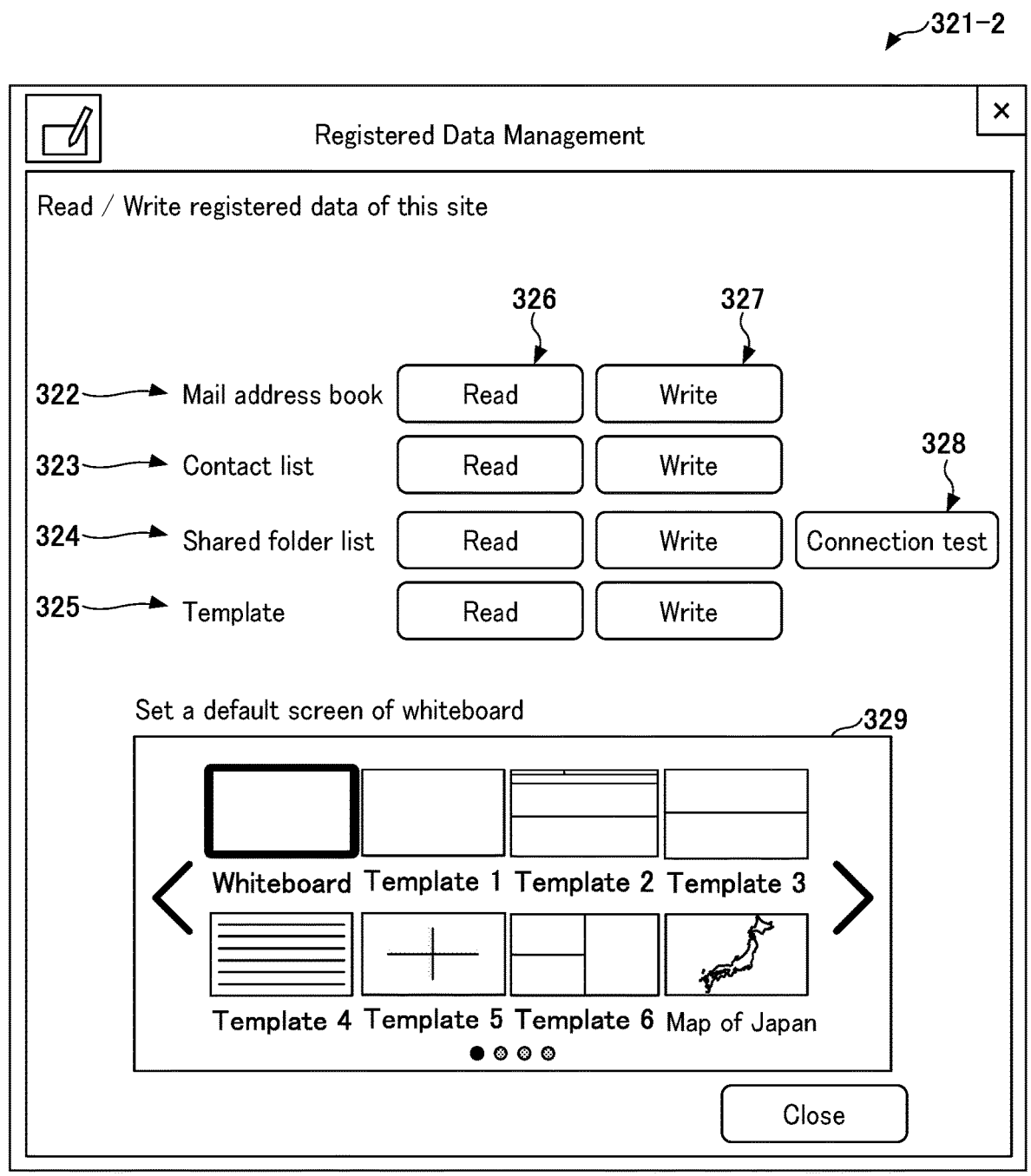
FIG. 10 is an illustration of a setting information setting screen used by an administrator to set settings via a display of the electronic whiteboard according to one of the embodiments.

FIG. 10 is an illustration of a setting information setting screen 321-2 (UI setting) used by the administrator to set the same settings via the display 3 of the electronic whiteboard 2. Information to be set is the same as in FIG. 9, and the setting information setting screen 321-2 includes items substantially the same as that of the setting information setting screen 321-1. Accordingly, the administrator can set the setting information on any one of the electronic whiteboards 2 without the terminal device 30.

Figure 11:
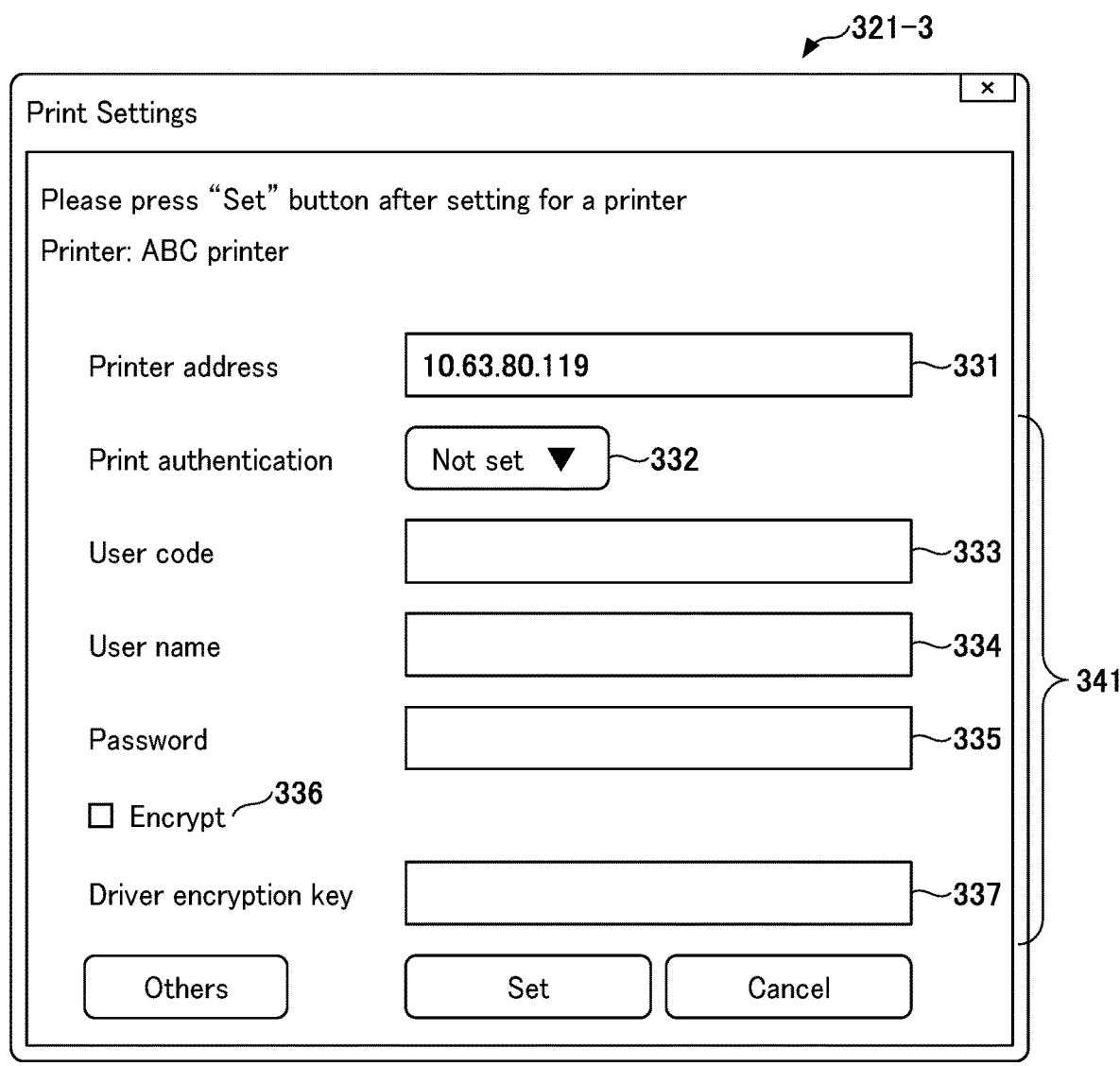
FIG. 11 is an illustration of a setting information setting screen used by the administrator to set a printer address via the display of the electronic whiteboard according to one of the embodiments.

FIG. 11 is an illustration of a setting information setting screen 321-3 (UI setting) used by the administrator to set a printer address via the display of the electronic whiteboard 2. The setting information setting screen 321-3 has a printer address field 331 and an authentication setting area 341. In the printer address field 331, an IP address of the printer used by the electronic whiteboard 2 is set.

In the authentication setting area 341, a setting button 332 for set whether authentication is required when the user uses the printer is displayed, and when the authentication is set as being required, authentication information is to be set. To set (input) the authentication information, there are a user code field 333 for setting a user identification information (ID), a user name field 334 for setting a user name, and a password field 335 for setting a password. In addition, there are a check box 336 for encrypting data to be printed and input field 337 for an encryption key.

The terminal device 30 also can set the same setting information by the web setting as being set in the screen illustrated in FIG. 11. The setting information illustrated in each of FIGS. 9 to 11 is a merely example, and other setting information may be set by the terminal device 30 or the electronic whiteboard 2.

Figure 12A:
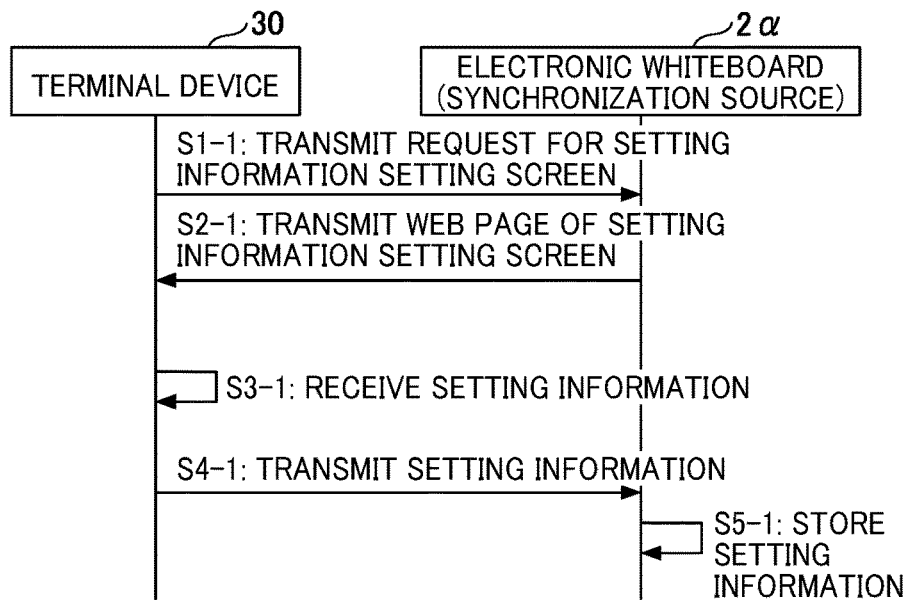
FIGS. 12A to 12C are sequence diagrams each illustrating a process of setting setting information by one of web setting and user interface (UI) setting according to one of the embodiments.

FIG. 12A is a sequence diagram illustrating a process of setting the setting information for each item by the web setting.

S1-1: When the administrator operates the terminal device 30, the communication unit 31 transmits an acquisition request for the setting information setting screen 321-1 to the electronic whiteboard (synchronization source) 2α. The electronic whiteboard (synchronization source) 2α is selected among the electronic whiteboards 2 by the administrator as a synchronization source, and the IP address and the like thereof are known in advance.

S2-1: The web server unit 13 of the electronic whiteboard (synchronization source) 2α transmits the web page of the setting information setting screen 321-1 in response to the acquisition request for the setting information setting screen 321-1.

S3-1: The display control unit 33 of the terminal device 30 displays the setting information setting screen 321-1. When the administrator appropriately sets the setting information, the operation receiving unit 32 receives the operation.

S4-1: The communication unit 31 of the terminal device 30 transmits the setting information to the electronic whiteboard (synchronization source) 2α.

S5-1: The web server unit 13 of the electronic whiteboard (synchronization source) 2α receives the setting information, and the setting information receiving unit 12 stores the setting information in the communication acquisition information storage unit 193.

Figure 12B:
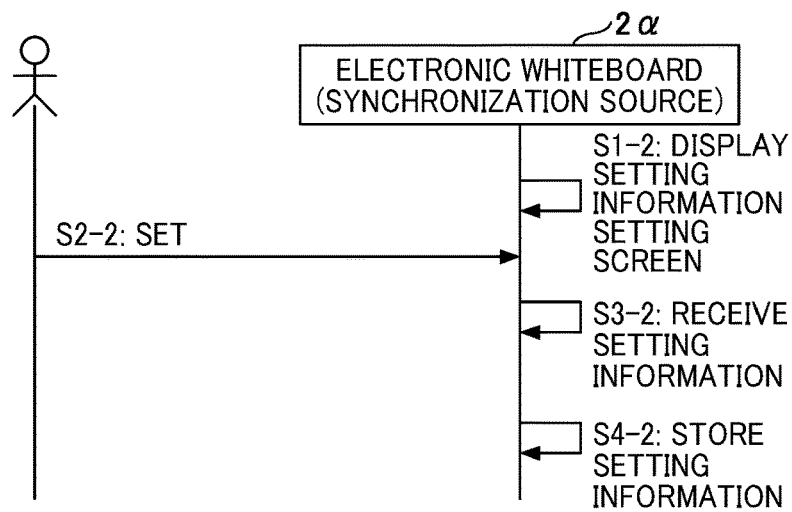

FIG. 12B is a sequence diagram illustrating a process of setting the setting information by the UI setting.

S1-2: When the administrator operates the electronic whiteboard (synchronization source) 2α, the communication unit 31 operates to display the setting information setting screen 321-2 and the setting information setting screen 321-3.

S2-2: The administrator appropriately sets the setting information.

S3-2: The setting receiving unit 11 of the electronic whiteboard (synchronization source) 2α receives the setting.

S4-2: The setting receiving unit 11 stores the setting information in the current setting information storage unit 192.

Figure 12C:
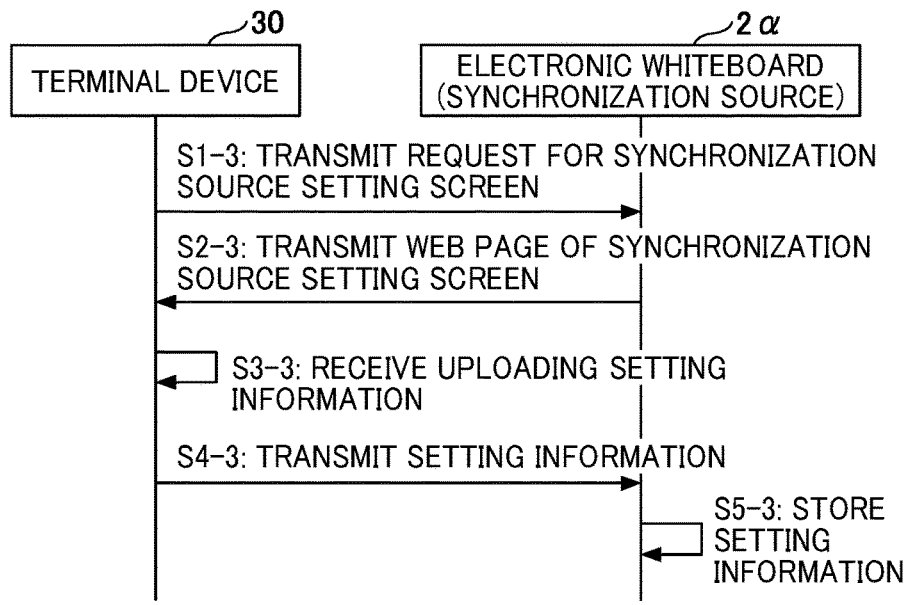

FIG. 12C is a sequence diagram illustrating a process of setting the setting information collectively by the web setting.

S1-3: When the administrator operates the terminal device 30, the communication unit 31 transmits an acquisition request for the synchronization source setting screen 301 to the electronic whiteboard (synchronization source) 2α. The electronic whiteboard (synchronization source) 2α is selected among the electronic whiteboards 2 by the administrator as a synchronization source, and the IP address and the like thereof are known in advance.

S2-3: The web server unit 13 of the electronic whiteboard (synchronization source) 2α transmits the web page of the synchronization source setting screen 301 in response to the acquisition request for the synchronization source setting screen 301.

S3-3: The display control unit 33 of the terminal device 30 displays the synchronization source setting screen 301. When the administrator clicks (presses) the upload button 312 in the batch setting area 311 of the setting information, the operation receiving unit 32 receives the operation.

S4-3: The communication unit 31 of the terminal device 30 transmits all the setting information to the electronic whiteboard (synchronization source) 2α.

S5-3: The web server unit 13 of the electronic whiteboard (synchronization source) 2α receives all the setting information, and the setting information receiving unit 12 stores the setting information in the communication acquisition information storage unit 193.

<Operation Process>

FIG. 13 is a sequence diagram illustrating an example of a process in which the electronic whiteboard (synchronization source) 2α transmits the setting information to the electronic whiteboard (synchronization destination) 2. In the example of FIG. 13, the information for synchronization, which indicates whether to be synchronized, of the electronic whiteboard (synchronization destination) 2A indicates "to be synchronized" and the information for synchronization of the electronic whiteboard (synchronization destination) 2B indicates "not to be synchronized".

S1-4: When a synchronization timing comes, the setting information transmission and reception unit 14 of the electronic whiteboard (synchronization source) 2α transmits to the electronic whiteboard (synchronization destination) 2A a request for information for synchronization (information indicating whether to be synchronized) using an IP address registered as a destination in the synchronization destination list.

S2-4: The synchronization information receiving unit 16 of the electronic whiteboard (synchronization destination) 2A reads from the synchronization destination setting design storage unit 196 the information for synchronization to be transmitted to the electronic whiteboard (synchronization source) 2α. In the example of FIG. 13, "to synchronized" is received in S2-4 as the information for synchronization.

S3-4: The setting information transmission and reception unit 14 of the electronic whiteboard (synchronization source) 2α receives the information for synchronization, which is "to be synchronized" or "not to be synchronized", and determines whether or not to transmit the setting information. A flowchart illustrating a process of the above-mentioned determination is illustrated in FIG. 14.

S4-4: Upon receiving the information for synchronization, which is "to be synchronized", the setting information transmission and reception unit 14 of the electronic whiteboard (synchronization source) 2α transmits the setting information, which is currently stored in the current setting information storage unit 192, to the electronic whiteboard (synchronization destination) 2A. The synchronization information receiving unit 16 of the electronic whiteboard (synchronization destination) 2A receives the setting information and stores the setting information in the synchronization acquisition setting information storage unit 195. The synchronization information receiving unit 16 also sets "Synchronized" as a synchronization state.

The electronic whiteboard (synchronization source) 2α applies substantially the same operation to the electronic whiteboard (synchronization destination) 2B. S5-4 to S7-4: The same operation is performed as the steps of S1-4 to S3-4. However, in S6-4 of the example of FIG. 13, "not to be synchronized" is received. Accordingly, the setting information receiving unit 12 of the electronic whiteboard (synchronization source) 2α neither performs the subsequent operation nor transmits the setting information to the electronic whiteboard (synchronization destination) 2B.

Figure 14:
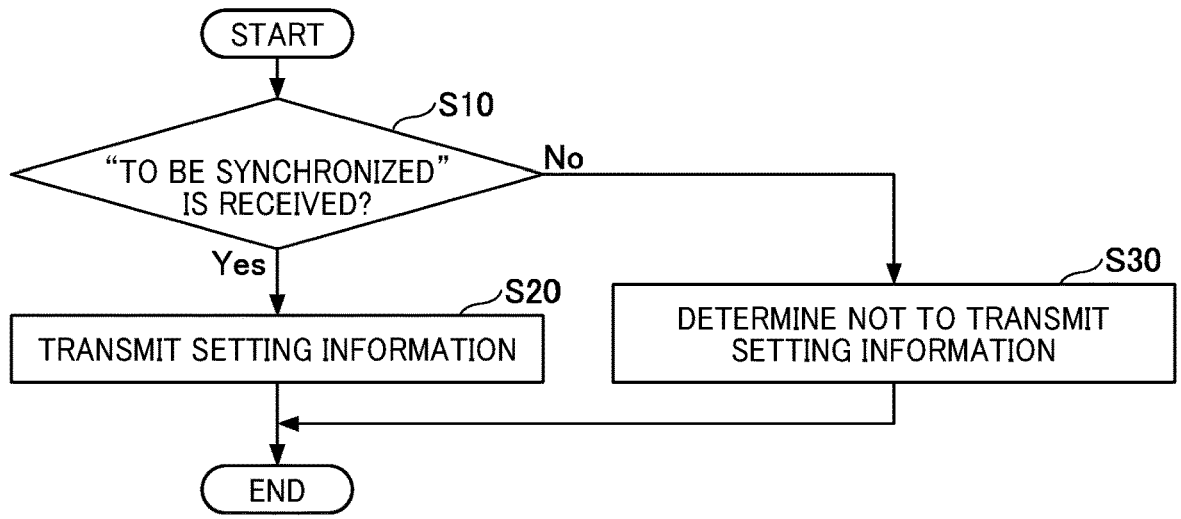
FIG. 14 is a flowchart illustrating an example of a process of determining whether or not to transmit the setting information based on information for synchronization, which is performed by the electronic whiteboard of synchronization source, according to one of the embodiments.

FIG. 14 is a flowchart illustrating an example of a process of determining whether or not to transmit the setting information, based on the information for synchronization, which is performed by the electronic whiteboard (synchronization source) 2α. The process illustrated in FIG. 14 starts when the electronic whiteboard (synchronization source) 2α receives the information for synchronization.

The setting information transmission and reception unit 14 of the electronic whiteboard (synchronization source) 2α determines whether "to be synchronized" is received as the information for synchronization (S10).

When the determination in S10 is No, the setting information transmission and reception unit 14 determines not to transmit the setting information (S30).

When the determination in S10 is Yes, the setting information transmission and reception unit 14 determines to transmit the setting information (S20).

As described above, the setting information transmission and reception unit 14 of the electronic whiteboard (synchronization source) 2α transmits the setting information for synchronization only when the electronic whiteboard (synchronization destination) 2 has the information for synchronization indicating "to be synchronized", and the electronic whiteboard (synchronization destination) 2 is to synchronize the setting information.

<Reflecting Setting Information>

In the case of the UI setting, the setting information is reflected on the electronic whiteboard (synchronization destination) 2 in real time, however in the case of the web setting and the synchronization setting, the setting information is reflected on the electronic whiteboard (synchronization destination) 2 by restarting. The electronic whiteboard (synchronization destination) 2 restarts in the case of the web setting and the synchronization setting to be sure that the setting information is not changed by a user operation. In the case of the UI setting, the settings are changed by the user so that changes in the setting information does not cause any problem. Such changes are preferably reflected immediately.

Figure 15:
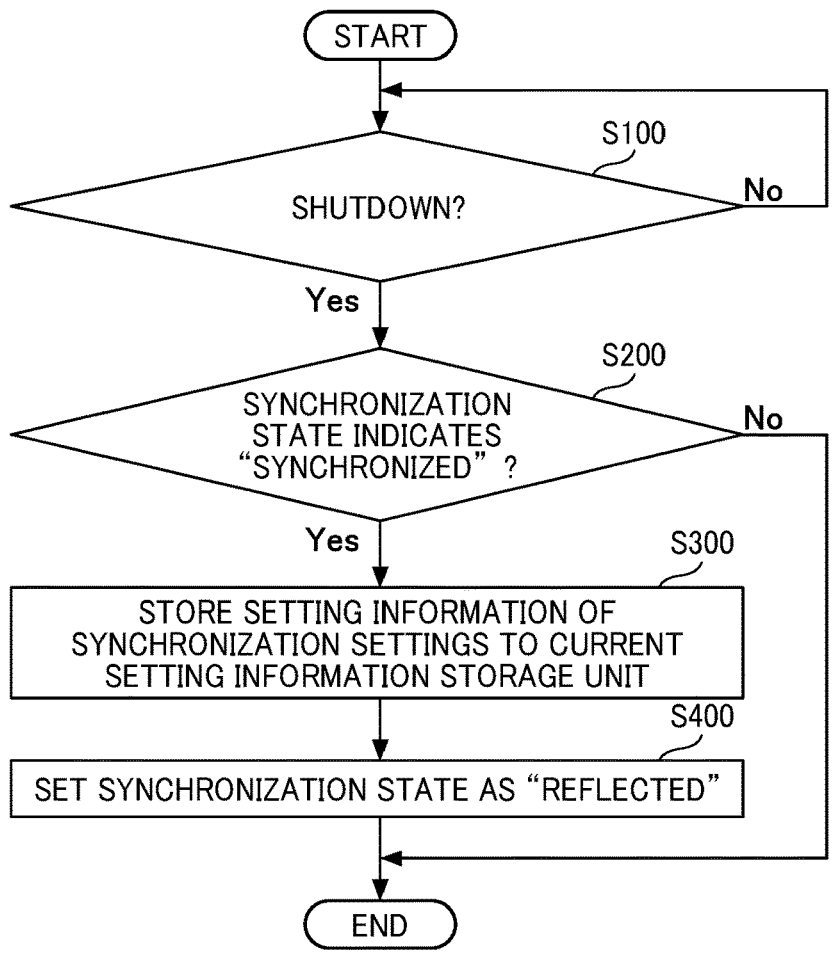
FIG. 15 is a flowchart of an example of a process of reflecting setting information on the electronic whiteboard of synchronization destination, according to one of the embodiments.

FIG. 15 is a flowchart illustrating an example of a process of reflecting the setting information on the electronic whiteboard (synchronization destination) 2. In the example of FIG. 15, the setting information is reflected by shutdown and restart.

The setting information reflection unit 15 of the electronic whiteboard (synchronization destination) 2 determines whether the electronic whiteboard (synchronization destination) 2 shuts down (S100). The shutdown is executed by the user, or at a restart timing set in the synchronization destination setting design storage unit 196.

The setting information reflection unit 15 determines whether the synchronization state is "Synchronized" during the shutdown of the electronic whiteboard 2 (S200). Here, the shutdown is defined as processing including saving data that is not previously saved, closing a file, etc.

When the synchronization state is not "Synchronized", the setting information is not previously acquired from the electronic whiteboard (synchronization source) 2α before the shutdown (during operating), and the process of FIG. 15 ends.

When the synchronization state is "Synchronized", the setting information reflection unit 15 stores, in the current setting information storage unit 192, the setting information stored in the synchronization acquisition setting information storage unit 195 or the communication acquisition information storage unit 193 (S300). When starting up next time, the electronic whiteboard (synchronization destination) 2 operates based on the setting information stored in the current setting information storage unit 192, accordingly.

Subsequently, the setting information reflection unit 15 sets "Reflected" as a synchronization state (S400). Namely, the reflection of the setting information is registered.

Thus, in the communication system 100 according to the present embodiment, the administrator is not required to set information (e.g., IP address) of the electronic whiteboard (synchronization source) 2α to the electronic whiteboard (synchronization destination) 2, resulting in reduction of the administrator's workload. Moreover, the administrator can set the information for synchronization for each synchronization destination, so that the electronic whiteboard (synchronization destination) 2, which is not desired to synchronize the setting information of the electronic whiteboard (synchronization source) 2α, is set not to be synchronized with the electronic whiteboard (synchronization source) 2α. Additionally, even when the administrator wrongly sets the electronic whiteboard (synchronization destination) 2 to the electronic whiteboard (synchronization source) 2α, the information for synchronization of the electronic whiteboard (synchronization destination) 2, in which "not to be synchronized" is set, prevents a situation in which the electronic whiteboard (synchronization destination) 2, which is not desired to be synchronized, is wrongly synchronized.

Second Embodiment

Hereinafter, a description is given of the communication system 100 according to a second embodiment in which the electronic whiteboard (synchronization source) 2α determines whether or not to transmit the setting information according to a synchronization state of the electronic whiteboard (synchronization destination) 2. This determination prevents the electronic whiteboard (synchronization source) 2α from transmitting the setting information, which is previously transmitted to the electronic whiteboard (synchronization destination) 2, again, and thereby reducing the transmission load.

In the following description of the second embodiment, the same functional blocks and the same information stored in the storage unit 19 that are used in the description of the first embodiment are used.

Figure 16:
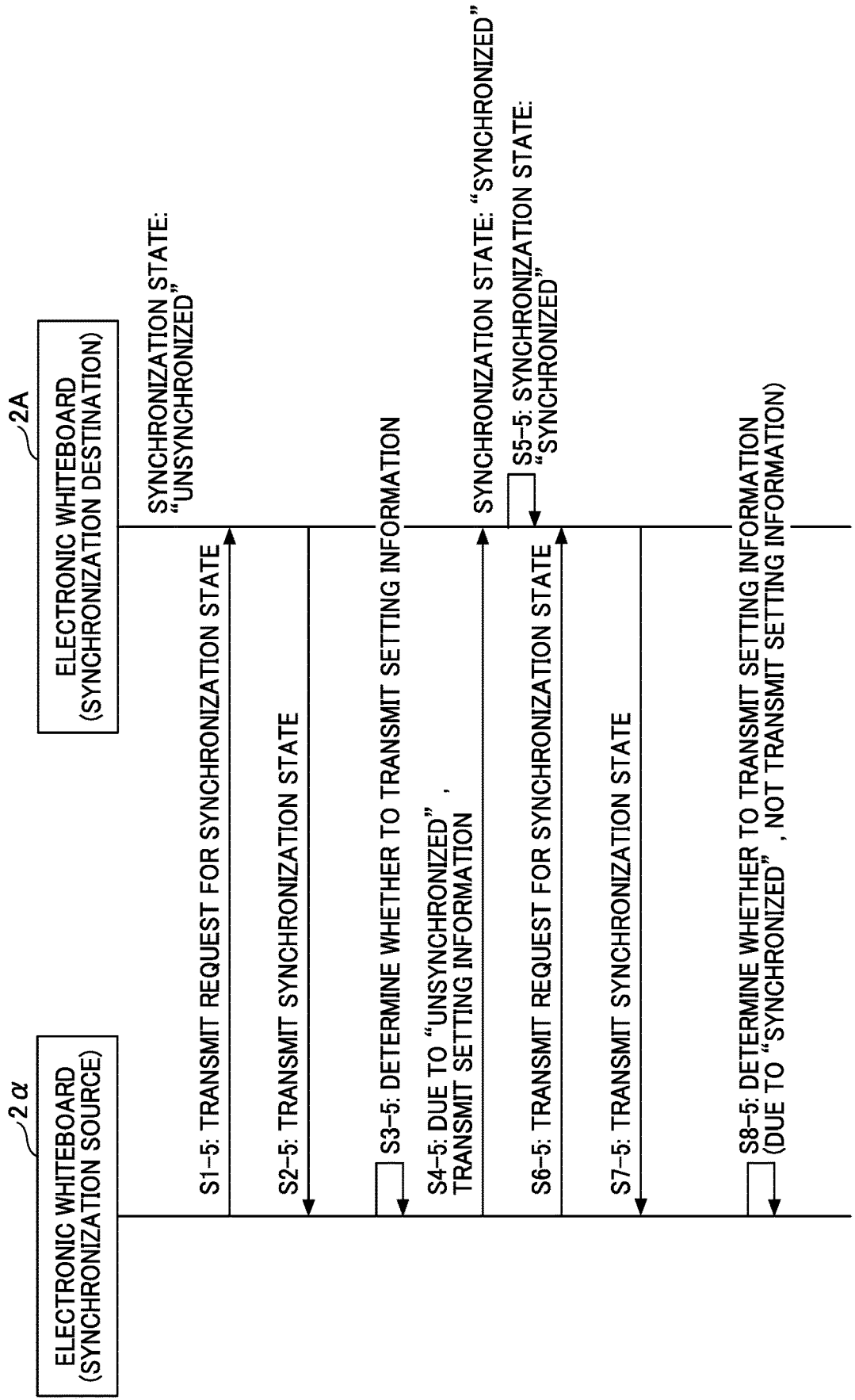
FIG. 16 is a sequence diagram illustrating an example of a process in which the electronic whiteboard of synchronization source transmits setting information to the electronic whiteboard of synchronization destination, according to one of the embodiments (second embodiment)

FIG. 16 is a sequence diagram illustrating an example of a process in which the electronic whiteboard (synchronization source) 2α transmits the setting information to the electronic whiteboard (synchronization destination) 2. In FIG. 16, although steps of determining whether to be synchronized or not is omitted, however the steps are performed. The same applies to the other embodiments that are described later.

S1-5: When a synchronization timing comes, the setting information transmission and reception unit 14 of the electronic whiteboard (synchronization source) 2α transmits to the electronic whiteboard (synchronization destination) 2A a request for a flag related to the setting information using an IP address registered as a destination in the synchronization destination list.

S2-5: The synchronization information receiving unit 16 of the electronic whiteboard (synchronization destination) 2A reads from the synchronization destination setting design storage unit 196 the synchronization state to be transmitted to the electronic whiteboard (synchronization source) 2α. In the example of FIG. 16, "Unsynchronized" is received in S2-5.

Figure 17:
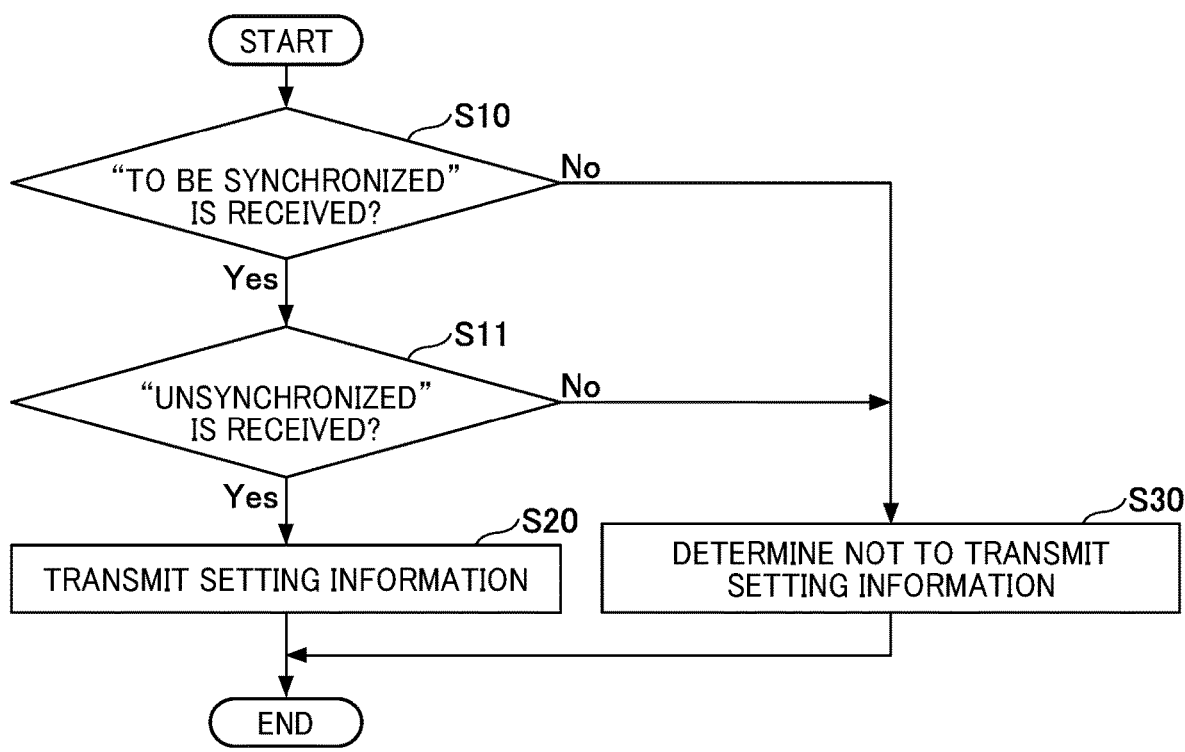
FIG. 17 is a flowchart illustrating an example of a process of determining whether or not to transmit setting information based on information for synchronization and a synchronization state, which is performed by the electronic whiteboard of synchronization source, according to one of the embodiments.

S3-5: The setting information transmission and reception unit 14 of the electronic whiteboard (synchronization source) 2α receives a synchronization state and determines whether or not to transmit the setting information. A flowchart illustrating a process of the above-mentioned determination is illustrated in FIG. 17.

S4-5: Upon receiving "Unsynchronized", the setting information transmission and reception unit 14 of the electronic whiteboard (synchronization source) 2α transmits the setting information, which is currently stored in the current setting information storage unit 192, to the electronic whiteboard (synchronization destination) 2A.

S5-5: The synchronization information receiving unit 16 of the electronic whiteboard (synchronization destination) 2A receives the setting information, stores the setting information in the synchronization acquisition setting information storage unit 195, and sets the synchronization state to "Synchronized".

S6-5: Similarly, when another synchronization timing comes, the setting information transmission and reception unit 14 of the electronic whiteboard (synchronization source) 2α transmits a request for a synchronization state to the electronic whiteboard (synchronization destination) 2A using the IP address registered as a destination in the synchronization destination list.

S7-5: The synchronization information receiving unit 16 of the electronic whiteboard (synchronization destination) 2A reads from the synchronization destination setting design storage unit 196 the synchronization state to be transmitted to the electronic whiteboard (synchronization source) 2α. In the example of FIG. 16, "Synchronized" is received in S7-5 as a synchronization state.

S8-5: The setting information transmission and reception unit 14 of the electronic whiteboard (synchronization source) 2α receives the synchronization state and determines whether or not to transmit the setting information.

Because receiving "Synchronized", the setting information transmission and reception unit 14 does not transmit the setting information.

FIG. 17 is a flowchart illustrating an example of a process of determining whether or not to transmit the setting information, based on information for synchronization, and a synchronization state, which is performed by the electronic whiteboard (synchronization source) 2α. In the following description on FIG. 17, the differences from FIG. 14 are described. Step of S10 is the same as that illustrated in FIG. 14.

When the determination in S10 is Yes, the setting information transmission and reception unit 14 determines whether "Unsynchronized" is received as the synchronization state (S11).

When the determination in S11 is No, the setting information transmission and reception unit 14 determines not to transmit the setting information (S30).

When the determination in S11 is Yes, the setting information transmission and reception unit 14 determines to transmit the setting information (S20).

The process of reflecting the setting information may be substantially the same as that illustrated in FIG. 15 of the first embodiment.

As described above, the setting information transmission and reception unit 14 of the electronic whiteboard (synchronization source) 2α according to the second embodiment transmits the setting information for synchronization when the electronic whiteboard (synchronization destination) 2 does not previously receive the setting information. This reduces the transmission load.

Third Embodiment

Hereinafter, a description is given of the communication system 100 according to a third embodiment in which a synchronization state is set to "Unsynchronized" due to the UI setting.

A description is given below of a background of the present embodiment. Upon receiving the setting information for synchronization, a synchronization state of the electronic whiteboard (synchronization destination) 2 is set to "Synchronized". The following indicates the synchronization state at this time. Synchronization state: "Synchronized". Subsequently, the setting information, which is previously synchronized, is reset by the UI setting. There may be a case where a user temporality switches printers or templates. The following indicates the synchronization state at this time. Synchronization state: "Synchronized" or "Reflected". According to the second embodiment, the electronic whiteboard (synchronization destination) 2 having a synchronization state of "Synchronized" does not receive the setting information. Even after shutting down and restarting, the electronic whiteboard (synchronization destination) 2, of which the synchronization state becomes "Reflected", does not receive the setting information. Accordingly, the setting information of the electronic whiteboard (synchronization destination) 2 is not currently synchronized and the electronic whiteboard (synchronization destination) 2 operates set by the current setting information, which is set due to the UI setting.

Figure 18:
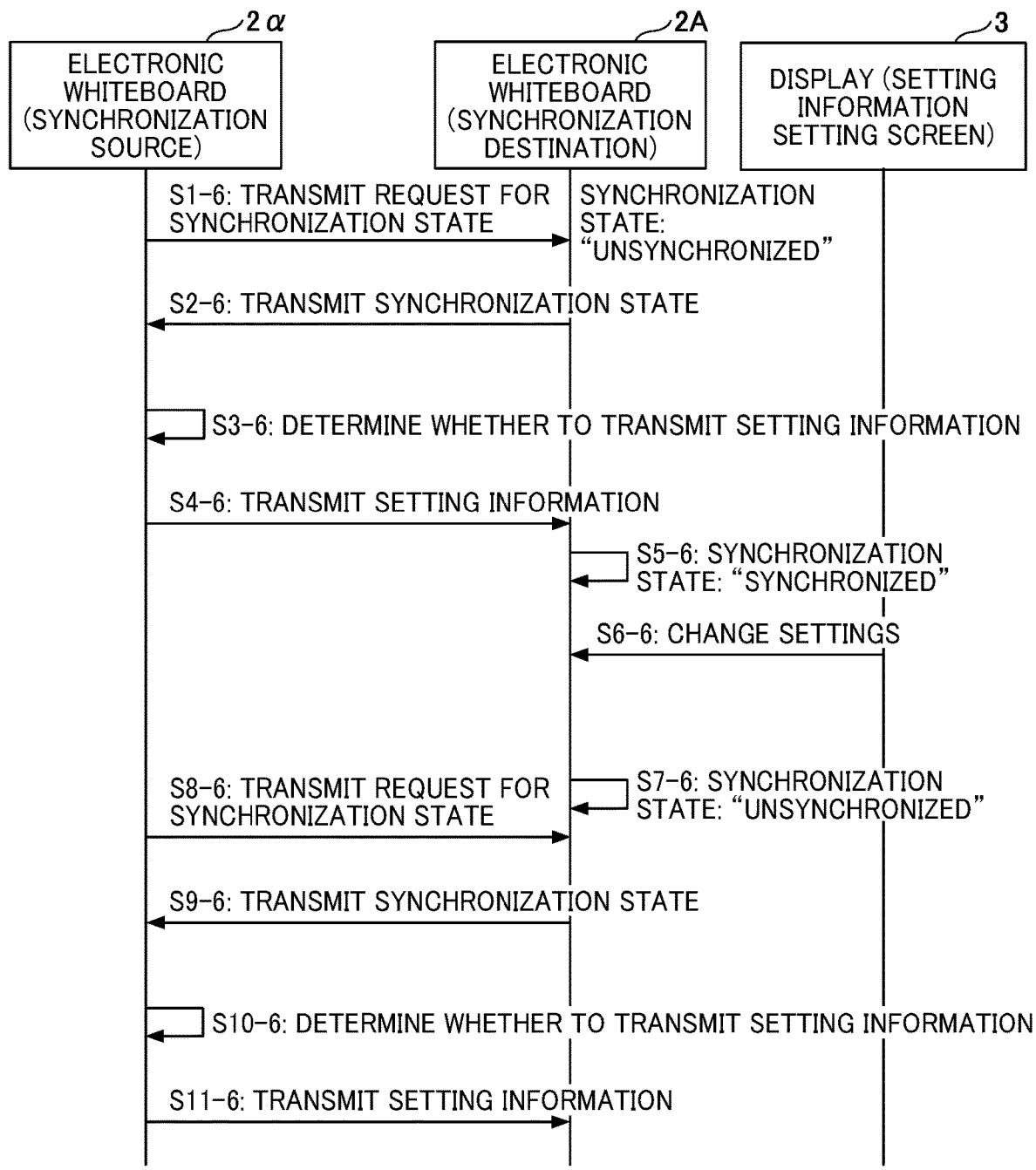
FIG. 18 is a sequence diagram illustrating an example of a process in which the electronic whiteboard of synchronization source transmits setting information to the electronic whiteboard of synchronization destination, according to one of the embodiments (third embodiment)

FIG. 18 is a sequence diagram illustrating an example of a process in which the electronic whiteboard (synchronization source) 2α transmits the setting information to the electronic whiteboard (synchronization destination) 2. The steps S1-6 to S5-6 of the process may be substantially the same as the steps of S1-5 to S5-5 of the process illustrated in FIG. 16 S6-6: The setting receiving unit 11 of the electronic whiteboard (synchronization destination) 2 receives settings of resetting the setting information that is input via the display 3 (UI setting). S7-6: The setting receiving unit 11 also sets "Unsynchronized" as a synchronization state to receive the setting information for synchronization.

Steps S8-6 to S11-6 are substantially the same as steps S1-6 to S4-6, but the synchronization state is "Unsynchronized". Accordingly, the electronic whiteboard (synchronization source) 2α can transmit the setting information to the electronic whiteboard (synchronization destination) 2.

The process of reflecting the setting information on the electronic whiteboard (synchronization destination) 2 may be substantially the same as that in FIG. 15.

Therefore, the electronic whiteboard (synchronization destination) 2 according to the present embodiment is able to receive the setting information for synchronization after the setting information is received and the setting information is set due to the UI setting, because the synchronization state is set to "Unsynchronized" when the setting information is set by the UI setting. That is, even if the administrator directly sets the setting information, the setting information is appropriately changed to the setting information for synchronization again.

Fourth Embodiment

Hereinafter, a description is given of the communication system 100 according to a fourth embodiment, in which an identifier, or identification information (ID), is assigned to the setting information transmitted from the electronic whiteboard (synchronization source) 2α.

The electronic whiteboard (synchronization destination) 2 transmits an ID of the setting information in addition to a synchronization state ("Synchronized") to the electronic whiteboard (synchronization source) 2α, and the electronic whiteboard (synchronization source) 2α transmits the setting information when the ID received from the electronic whiteboard (synchronization destination) 2 does not match an ID of the setting information to be transmitted. This allows the electronic whiteboard (synchronization destination) 2 that has a synchronization state of "Synchronized" to receive new setting information.

In the present embodiment, information stored in the synchronization destination setting design storage unit 196 is different from that of the first embodiment to third embodiment. The differences are described below.

TABLE 4

| | |
|---|---|
| Information for Synchronization (whether to be synchronized) | "to be synchronized" or "not to be synchronized" |
| Synchronization State | "Unsynchronized" or "Synchronized" (0001) or "Reflected" (0001) |
| Restarting Timing | *At 6:00<br>At Restarting<br>Every 12 hours |

Table 4 schematically illustrates the information stored in the synchronization destination setting design storage unit 196. In the present embodiment, an ID (0001 in Table 4) of the setting information is set for a synchronization state of "Synchronized". The same ID of the setting information is set for a synchronization state of "Reflected". With the ID, not only whether the setting information is received, but also which setting information is received is able to be determined. The ID of the setting information is assigned by the electronic whiteboard (synchronization source) 2α so that uniqueness of the ID is guaranteed.

<Operation>

Figure 19:
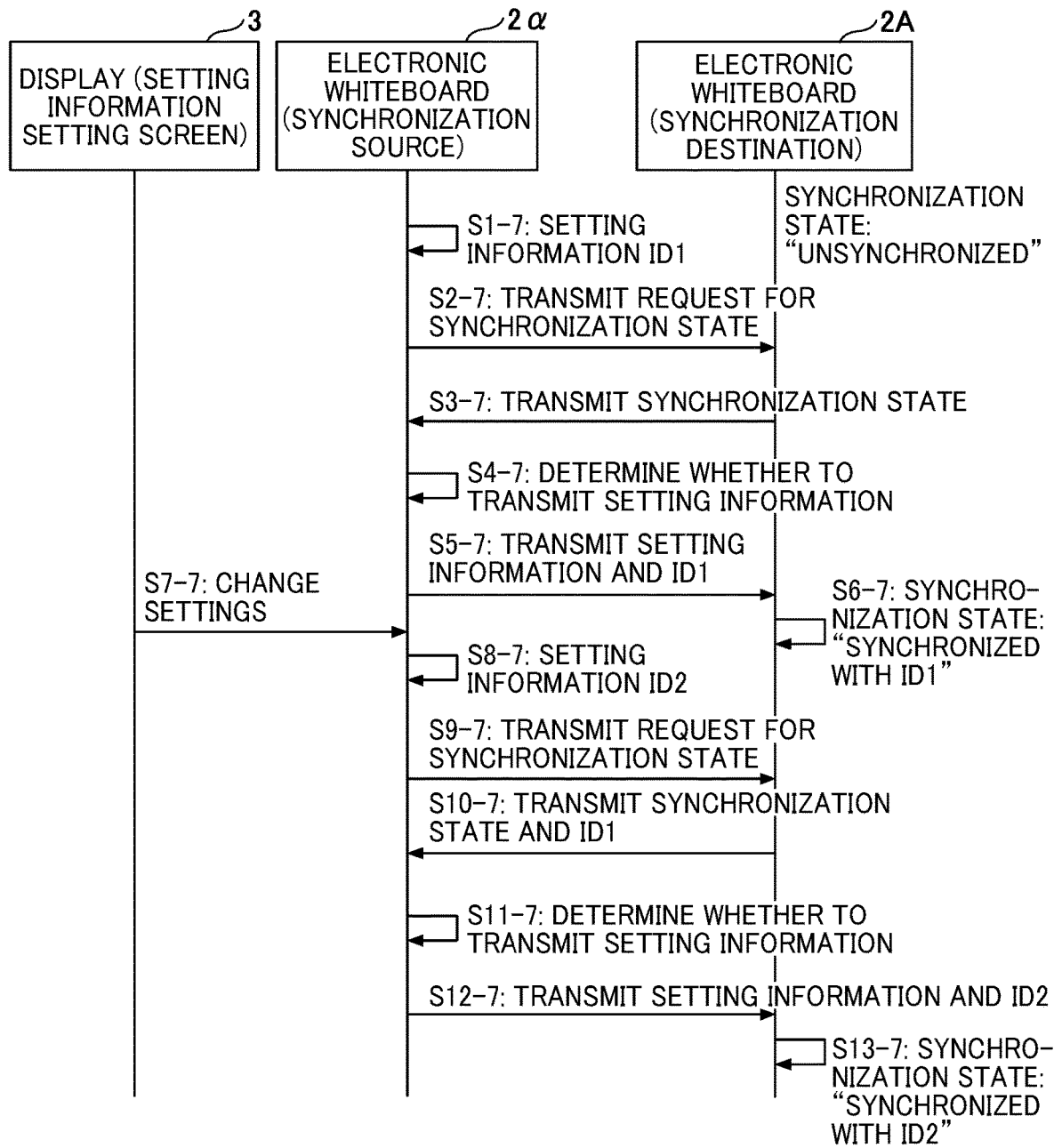
FIG. 19 is a sequence diagram illustrating an example of a process in which the electronic whiteboard of synchronization source transmits setting information to the electronic whiteboard of synchronization destination, according to one of the embodiments (fourth embodiment)

FIG. 19 is a sequence diagram illustrating an example of a process in which the electronic whiteboard (synchronization source) 2α transmits the setting information to the electronic whiteboard (synchronization destination) 2.

S1-7: The setting information transmission and reception unit 14 of the electronic whiteboard (synchronization source) 2α assigns identification information, an ID1, to the setting information.

S2-7: When a synchronization timing comes, the setting information transmission and reception unit 14 of the electronic whiteboard (synchronization source) 2α transmits a request for a synchronization state to the electronic whiteboard (synchronization destination) 2A using an IP address registered as a destination in the synchronization destination list.

S3-7: The synchronization information receiving unit 16 of the electronic whiteboard (synchronization destination) 2A reads from the synchronization destination setting design storage unit 196 a synchronization state to be transmitted to the electronic whiteboard (synchronization source) 2α. In the example of FIG. 19, "Unsynchronized" is received in S3-7.

Figure 20:
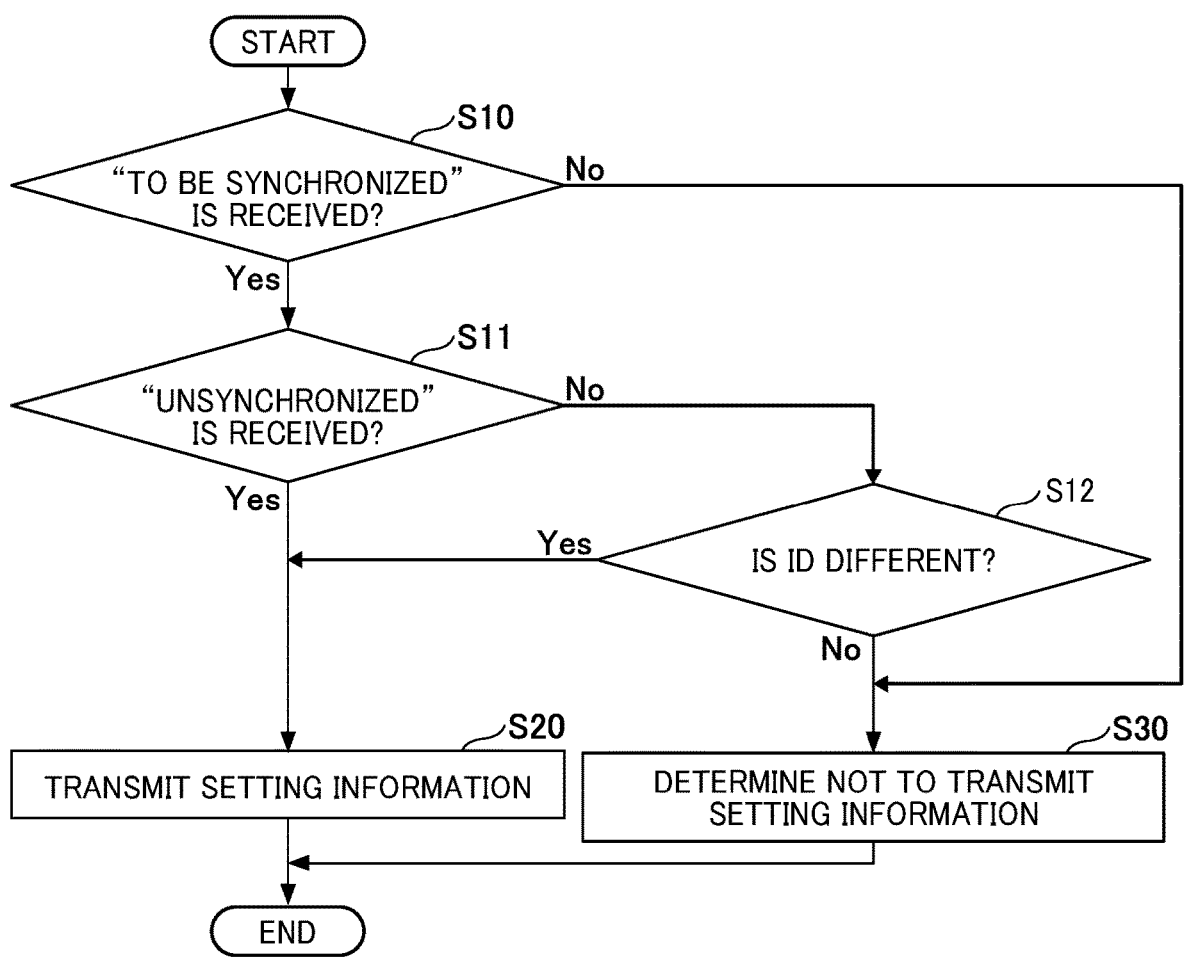
FIG. 20 is a flowchart illustrating an example of a process of determining whether or not to transmit setting information based on a synchronization state and identification information of the setting information, which is performed by the electronic whiteboard of synchronization source, according to one of the embodiments.

S4-7: The setting information transmission and reception unit 14 of the electronic whiteboard (synchronization source) 2α receives the synchronization state and determines whether or not to transmit the setting information. A flowchart illustrating a process of the above-mentioned determination is illustrated in FIG. 20.

S5-7: Upon receiving "Unsynchronized", the setting information transmission and reception unit 14 of the electronic whiteboard (synchronization source) 2α transmits the setting information and the identification information (ID1) stored in the current setting information storage unit 192 to the electronic whiteboard (synchronization destination) 2A.

S6-7: The synchronization information receiving unit 16 of the electronic whiteboard (synchronization destination) 2A receives the setting information and the identification information (ID1), stores the setting information in the synchronization acquisition setting information storage unit 195, sets "Synchronized" as a synchronization state, and sets the identification information (ID1).

S7-7: The administrator sets (changes) the setting information via the display 3 of the electronic whiteboard (synchronization source) 2α (UI setting).

S8-7: The setting information transmission and reception unit 14 of the electronic whiteboard (synchronization source) 2α assigns identification information, ID2, to the setting information.

S9-7: When another synchronization timing comes, the setting information transmission and reception unit 14 of the electronic whiteboard (synchronization source) 2α transmits a request for a synchronization state to the electronic whiteboard (synchronization destination) 2A using the IP address registered as a destination in the synchronization destination list.

S10-7: The synchronization information receiving unit 16 of the electronic whiteboard (synchronization destination) 2A reads from the synchronization destination setting design storage unit 198 the synchronization state ("Synchronized") and the identification information (ID1) to be transmitted to the electronic whiteboard (synchronization source) 2α.

S11-7: The setting information transmission and reception unit 14 of the electronic whiteboard (synchronization source) 2α receives the synchronization state ("Synchronized") and the identification information ID1, and determines whether or not to transmit the setting information by comparing the identification information ID2 with the identification information ID1. In S11-7 of FIG. 19, the identification information ID1 is determined to be different from the identification ID2, and the setting information transmission and reception unit 14 determines to transmit the setting information.

S12-7: The setting information transmission and reception unit 14 of the electronic whiteboard (synchronization source) 2α transmits the setting information and identification information (ID2) stored in the current setting information storage unit 192 to the electronic whiteboard (synchronization destination) 2A.

S13-7: The synchronization information receiving unit 16 of the electronic whiteboard (synchronization destination) 2A receives the setting information and the identification information (ID2), stores the setting information in the synchronization acquisition setting information storage unit 195, sets "Synchronized" as a synchronization state, and sets the identification information (ID2).

FIG. 20 is a flowchart illustrating an example of a process of determining whether or not to transmit the setting information, based on a synchronization state and identification information of the setting information, which is performed by the electronic whiteboard (synchronization source) 2α. In the following description on FIG. 20, the differences from FIG. 17 are described. Step of S10 and S11 is the same as that illustrated in FIG. 17.

When the determination in S11 is No, the setting information transmission and reception unit 14 determines whether the identification information of the setting information to be transmitted is different from the identification information transmitted from the electronic whiteboard (synchronization destination) 2 (S12).

When the determination in S12 is Yes, the setting information transmission and reception unit 14 determines to transmit the setting information (S20).

When the determination in S12 is No, the setting information transmission and reception unit 14 determines not to transmit the setting information (S30).

The process of reflecting the setting information may be the same as that illustrated in FIG. 15.

Therefore, in the communication system 100 according to the fourth embodiment, in which identification information is assigned to the setting information, the electronic whiteboard (synchronization source) 2α is able to transmit the latest setting information even when the electronic whiteboard (synchronization destination) 2 previously receives the setting information.

Fifth Embodiment

Hereinafter, a description is given of the communication system 100 according to a fifth embodiment, in which the electronic whiteboard (synchronization destination) 2 is able to receive setting information from different electronic whiteboards (synchronization sources) 2α by using the configuration of the fourth embodiment.

Figure 21:
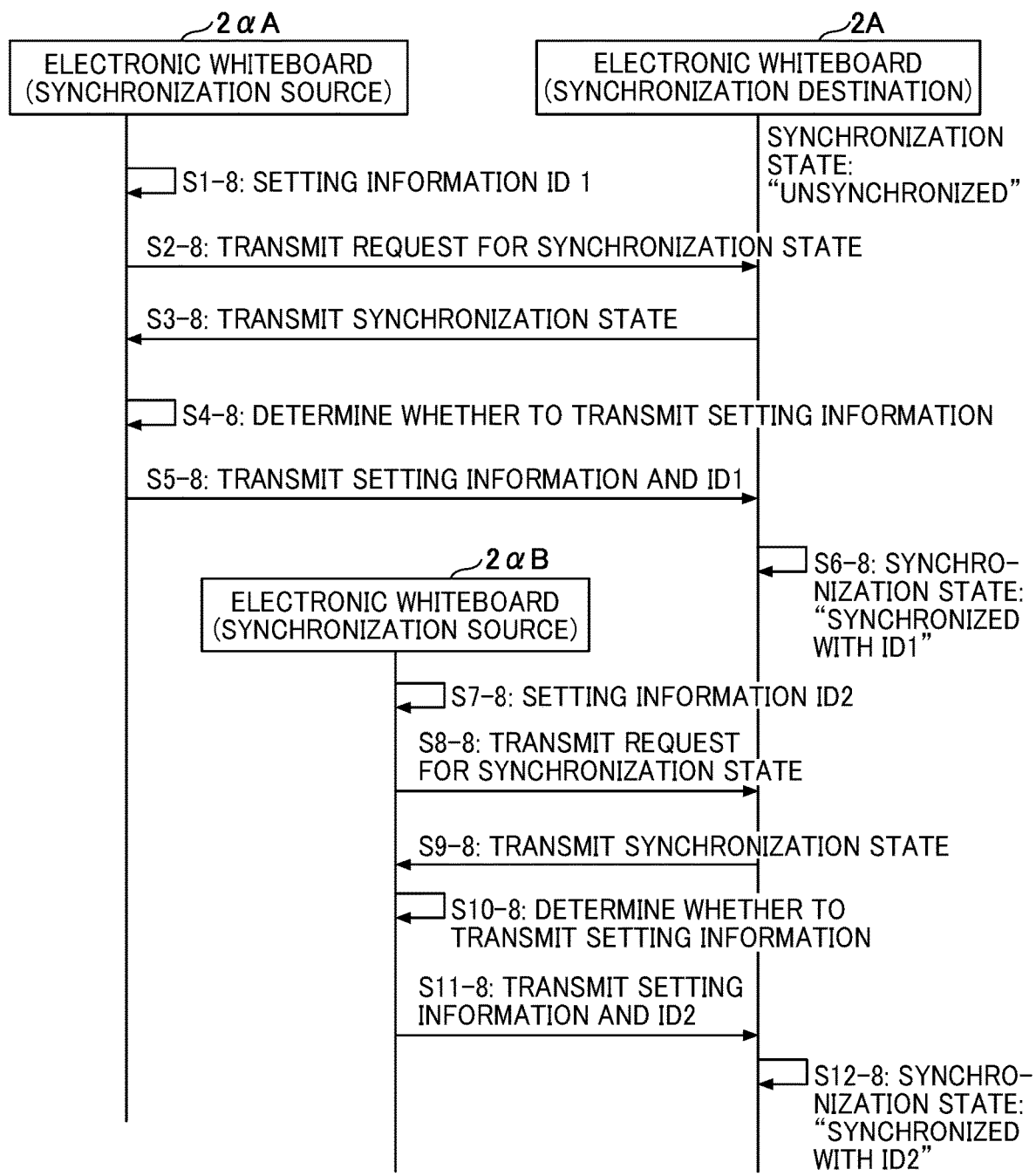
FIG. 21 is a sequence diagram illustrating an example of a process in which the electronic whiteboard of synchronization source transmits setting information to the electronic whiteboard of synchronization destination, according to one of the embodiments (fifth embodiment)

FIG. 21 is a sequence diagram illustrating an example of a process in which the electronic whiteboard (synchronization source) 2α transmits the setting information to the electronic whiteboard (synchronization destination) 2. In the following description on FIG. 21, the differences from FIG. 19 are described.

The step S1-8 to S5-8 of the process illustrated in FIG. 21 may be substantially the same as the steps of S1-7 to S5-7 of the process illustrated in FIG. 19. Subsequent to S5-8, the electronic whiteboard (synchronization source) 2α is switched from an electronic whiteboard (synchronization source) 2α A to an electronic whiteboard (synchronization source) 2αB. The switching of the electronic whiteboard (synchronization source) 2α can be done by the administrator via the synchronization source setting screen 301 as described above. There are some reasons for the switching. For example, the electronic whiteboard (synchronization source) 2α is replaced with another one. The subsequent steps of S7-8 to S12-8 of the process illustrated in FIG. 21 may be the same as the steps S8-7 to S13-7 of the process illustrated in FIG. 19.

Therefore, in the communication system 100 according to the fifth embodiment, the electronic whiteboard (synchronization destination) 2 is able to receive the latest setting information, by using identification information assigned to setting information, even when the electronic whiteboard (synchronization source) 2α is switched to another one.

Sixth Embodiment

Hereinafter, a description is given of the communication system 100 according to a sixth embodiment, in which the electronic whiteboard (synchronization destination) 2 sets "Unsynchronized" as a synchronization state when being in a synchronization state of "Reflected" and receiving resetting the setting information by the UI setting. Because "Unsynchronized" is set as a synchronization state, the electronic whiteboard (synchronization destination) 2 is to synchronize the setting information of the electronic whiteboard (synchronization source) 2α.

Figure 22:
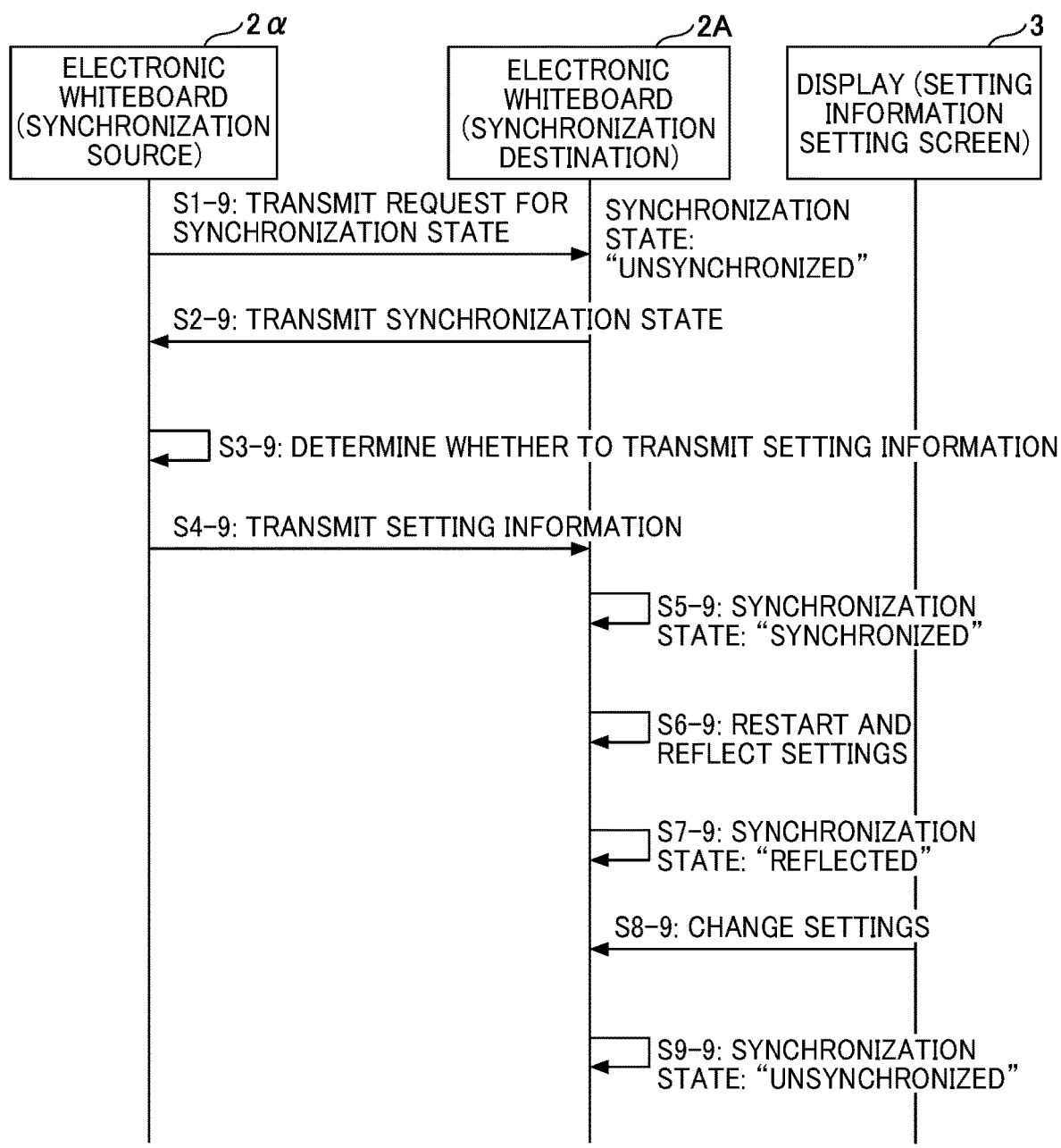
FIG. 22 is a sequence diagram illustrating an example of a process in which the electronic whiteboard of synchronization source transmits setting information to the electronic whiteboard of synchronization destination, according to one of the embodiments (sixth embodiment).

FIG. 22 is a sequence diagram illustrating an example of a process in which the electronic whiteboard (synchronization source) 2α transmits the setting information to the electronic whiteboard (synchronization destination) 2. In the following description on FIG. 22, the differences from FIG. 18 are described. The steps of S1-9 to S5-9 may be substantially the same as the steps of S1-6 to S5-6 in FIG. 18

S6-9: Subsequently, the electronic whiteboard (synchronization destination) 2 restarts (shuts down and starts up), and the setting information reflection unit 15 of the electronic whiteboard (synchronization destination) 2 stores the setting information stored in the synchronization acquisition setting information storage unit 195 in the current setting information storage unit 192.

S7-9: The setting information reflection unit 15 of the electronic whiteboard (synchronization destination) 2 changes the synchronization state to "Reflected".

S8-9: The administrator sets, namely changes, the setting information via the display 3 of the electronic whiteboard (synchronization destination) 2 (UI setting). Reasons for setting by the UI setting is the same as that described in the third embodiment.

S 9-9: The setting receiving unit 11 of the electronic whiteboard (synchronization destination) 2 detects the UI setting and sets "Unsynchronized" as a synchronization state to receive the setting information for synchronization.

As described above, the synchronization state of the electronic whiteboard (synchronization destination) 2 is changed from "Reflected" to "Unsynchronized" when the setting information is set by the UI setting, and thus, the synchronization state of the electronic whiteboard (synchronization destination) 2 is able to receive the setting information from the electronic whiteboard (synchronization source) 2α. Therefore, even if the administrator directly sets the setting information, the setting information is appropriately changed to the setting information for synchronization again.

As described above, according to the embodiments of the present disclosure, a communication system in which setting information is appropriately synchronized is provided.

<Other Example for Application>

The above-described embodiments are illustrative and do not limit the present disclosure. Thus, numerous additional modifications and variations are possible in light of the above teachings within the scope of the present disclosure. Any one of the above-described operations may be performed in various other ways, for example, in an order different from the one described above.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

In the description of the above embodiments, the electronic whiteboard (synchronization source) 2α does not transmit the setting information according to information for synchronization, a synchronization state and/or identification information of the setting information. However, the electronic whiteboard (synchronization source) 2α may transmit the setting information, and then the electronic whiteboard (synchronization destination) 2 may delete the setting information according to the information for synchronization, the synchronization state and/or the identification information of the setting information.

In addition, the functional configuration as illustrated in FIG. 6 is divided into blocks based on main functions of the electronic whiteboard 2, in order to facilitate understanding the processes performed by the electronic whiteboard 2. No limitation is intended by how the processes are divided or by the name of the processes. The processes implemented by the electronic whiteboard 2 may be divided to a larger number of processes depending on the contents of processes. Further, one process may be divided to include a larger number of processes.

Additionally, one or more of the storage units of the storage unit 19 illustrated in FIG. 6 may be on the network.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims

What is claimed is:

1. A communication system, comprising:
a first electronic whiteboard in which settings are set according to setting information, the first electronic whiteboard including a memory and first circuitry; and
a second electronic whiteboard settable according to the setting information, the second electronic whiteboard being communicably connected to the first electronic whiteboard, and the second electronic whiteboard including second circuitry configured to
acquire the setting information from the first electronic whiteboard,
store acquisition information that indicates whether to acquire the setting information from the first electronic whiteboard,
transmit the acquisition information to the first electronic whiteboard, and
set the second electronic whiteboard according to the setting information, wherein
the first circuitry is configured to
determine whether or not the acquisition information indicates that the second electronic whiteboard is to acquire the setting information,
transmit, in response to determining that the acquisition information indicates to acquire the setting information, the setting information to the second electronic whiteboard, and
determine, in response to determining that the acquisition information indicates not to acquire the setting information, not to transmit the setting information to the second electronic whiteboard.

2. The communication system of claim 1, wherein
in response to acquiring the setting information, the second circuitry sets a state associated with the setting information to a received state in response, and
the first circuitry
receives the state associated with the setting information from the second electronic whiteboard, and
transmits the setting information to the second electronic whiteboard in response to a determination indicating that the state associated with the setting information does not indicate the received state.

3. The communication system of claim 2, wherein
the second circuitry receives settings associated with the setting information according to a user operation to the second electronic whiteboard, and
in response to reception of the settings associated with the setting information, the second circuitry
sets the state associated with the setting information to an unreceived state, and
receives the setting information from the first electronic whiteboard.

4. The communication system of claim 3, wherein
the second circuitry
reflects the setting information on the second electronic whiteboard, and
sets the state associated with the setting information to a reflected state, and
the first circuitry determines not to transmit the setting information to the second electronic whiteboard in response to a determination indicating that the state associated with the setting information indicates the reflected state.

5. The communication system of claim 4, wherein in response to reception of the settings associated with the setting information, the second circuitry
sets the state associated with the setting information to the unreceived state from the reflected state, and
receives the setting information from the first electronic whiteboard.

6. The communication system of claim 2, wherein the first circuitry
transmits the setting information and identification information of the setting information to the second electronic whiteboard,
receives the state associated with the setting information and the identification information of the setting information from the second electronic whiteboard, and
transmits, in response to a determination indicating that the identification information previously transmitted to the second electronic whiteboard is different from the identification information, the setting information to the second electronic whiteboard.

7. The communication system of claim 6, further comprising a plurality of electronic whiteboards,
the plurality of electronic whiteboards includes the first electronic whiteboard,
each whiteboard of the plurality of electronic whiteboards includes first circuitry and is settable according to setting information, and
the first circuitry of each electronic whiteboard of the plurality of electronic whiteboards is configured to
transmit the setting information and the identification information of the setting information to the second electronic whiteboard, and
determine whether to transmit the setting information to the second electronic whiteboard based on at least one of the state associated with the setting information and the identification information received from the second electronic whiteboard.

8. A communication method performed by a first electronic whiteboard, the communication method comprising:
setting, by first circuitry of the first electronic whiteboard, the first electronic whiteboard according to setting information;
acquiring, from a second electronic whiteboard, acquisition information indicating whether the second electronic whiteboard is to acquire the setting information from the first electronic whiteboard;
determining, by the first circuitry, whether or not the acquisition information indicates that the second electronic whiteboard is to acquire the setting information;
transmitting, in response to determining that the acquisition information indicates that the second electronic whiteboard is to acquire the setting information, the setting information to the second electronic whiteboard; and
determining, in response to determining that the acquisition information indicates that the second electronic whiteboard is not to acquire the setting information, not to transmit the setting information to the second electronic whiteboard.

9. An electronic whiteboard, comprising:
a memory configured to store setting information, and
circuitry configured to
set the electronic whiteboard according to the setting information;
receive, from another electronic whiteboard, acquisition information indicating whether the another electronic whiteboard is to acquire the setting information from the electronic whiteboard;
determine whether or not the acquisition information indicates that the another electronic whiteboard is to acquire the setting information;
transmit, in response to determining that the acquisition information indicates that the another electronic whiteboard is to acquire the setting information, the setting information to the another electronic whiteboard, and
determine, in response to determining that the acquisition information indicates that the another electronic whiteboard is not to acquire the setting information, not to transmit the setting information to the another electronic whiteboard.

* * * * *